(12) United States Patent
Macready et al.

(10) Patent No.: US 7,870,087 B2
(45) Date of Patent: Jan. 11, 2011

(54) PROCESSING RELATIONAL DATABASE PROBLEMS USING ANALOG PROCESSORS

(75) Inventors: William G. Macready, West Vancouver (CA); Michael D. Coury, Vancouver (CA); Ivan King Yu Sham, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 694 days.

(21) Appl. No.: 11/932,261

(22) Filed: Oct. 31, 2007

(65) Prior Publication Data

US 2008/0116449 A1 May 22, 2008

Related U.S. Application Data

(60) Provisional application No. 60/864,127, filed on Nov. 2, 2006.

(51) Int. Cl.
*G06F 15/00* (2006.01)
*G06F 15/18* (2006.01)

(52) U.S. Cl. .......................................... 706/62; 257/31
(58) Field of Classification Search .................... 706/62
See application file for complete search history.

(56) References Cited

U.S. PATENT DOCUMENTS

| | | | |
|---|---|---|---|
| 6,421,658 B1 * | 7/2002 | Carey et al. ........................ 1/1 |
| 6,665,863 B1 * | 12/2003 | Lord et al. ................... 717/144 |
| 6,838,694 B2 | 1/2005 | Esteve et al. ................... 257/34 |
| 6,847,962 B1 * | 1/2005 | Cochrane et al. .................... 1/1 |
| 7,135,701 B2 | 11/2006 | Amin et al. ..................... 257/31 |
| 7,167,853 B2 * | 1/2007 | Zaharioudakis et al. ............ 1/1 |
| 7,177,798 B2 * | 2/2007 | Hsu et al. ....................... 704/9 |
| 7,305,409 B2 * | 12/2007 | Lord et al. .................. 707/798 |
| 7,392,264 B2 * | 6/2008 | Lord et al. ......................... 1/1 |
| 7,530,105 B2 * | 5/2009 | Gilbert et al. ................. 726/22 |
| 7,565,627 B2 * | 7/2009 | Brill et al. .................... 715/854 |
| 7,756,855 B2 * | 7/2010 | Ismalon ..................... 707/713 |
| 2005/0082519 A1 | 4/2005 | Amin et al. ..................... 257/13 |
| 2005/0250651 A1 | 11/2005 | Amin et al. ................... 505/846 |
| 2005/0256007 A1 | 11/2005 | Amin et al. .................. 505/170 |

OTHER PUBLICATIONS

A random walk through human associations, Tamir, R.; Data Mining, Fifth IEEE International Conference on Digital Object Identifier: 10.1109/ICDM.2005.12 Publication Year: 2005.*
U.S. Appl. No. 11/247,857, Murray et al., filed Oct. 10, 2005.

(Continued)

*Primary Examiner*—Michael Holmes
(74) *Attorney, Agent, or Firm*—Seed IP Law Group PLLC

(57) ABSTRACT

Systems, methods and articles solve queries or database problems through the use of graphs. An association graph may be formed based on a query graph and a database graph. The association graph may be solved for a clique, providing the results to a query or problem and/or an indication of a level of responsiveness of the results. Thus, unlimited relaxation of constraint may be achieved. Analog processors such as quantum processors may be used to solve for the clique.

69 Claims, 12 Drawing Sheets

OTHER PUBLICATIONS

U.S. Appl. No. 60/864,127, Macready et al., filed Nov. 2, 2006.
U.S. Appl. No. 60/864,129, Coury et al., filed Nov. 2, 2006.
U.S. Appl. No. 60/886,253, Harris, filed Jan. 23, 2007.
A High-Level Look at Optimization: Past, Present and Future, URL=http://www.e-optimization.com, download date May 2000.
Allen et al., "Blue Gene: A Vision for Protein Science Using a Petaflop Supercomputer," *IBM Systems Journal* 40(2):310-327, 2001.
Blatter et al., "Design Aspects of Superconducting-phase Quantum Bits," *Physical Review B* 63(174511):1-9, 2001.
Boyer and Myrvold, "On the Cutting Edge: Simplified $O(n)$ Planarity by Edge Addition," *Journal of Graph Algorithms and Applications* 8(3):241-273, 2004.
Dolan et al., "Optimization on the NEOS Server," *SIAM News* 35(6):1-5, Jul./Aug. 2002.
Farhi et al., "Quantum Adiabatic Evolution Algorithms versus Simulated Annealing," arXiv.org, URL=http://arxiv:quant-ph/0201031, pp. 1-16, Jan. 8, 2002.
Feynman, "Simulating Physics with Computers," *International Journal of Theoretical Physics* 21(6/7):467-488, 1982.
Fourer and Goux, "Optimization as an Internet Resource," *Interfaces* 31(2):130-150, Mar.-Apr. 2001.
Friedman et al., "Quantum Superposition of Distinct Macroscopic States," *Nature* 406:43-46, Jul. 6, 2000.
Gutwenger et al., "Graph Drawing Algorithm Engineering with AGD," in Diehl (ed.), *Lecture Notes in Computer Science 2269. Revised Lectures on Software Visualization, International Seminar*, Springer-Verlag, London, 2001, pp. 307-323.
Heckmann et al., "Optimal Embedding of Complete Binary Trees into Lines and Grids," in Schmidt and Berghammer (eds.), *Lecture Notes in Computer Science 570. Proceedings of the 17th International Workshop*, Springer-Verlag, London 1991, pp. 25-35.
Il'ichev et al., "Continuous Monitoring of Rabi Oscillations in a Josephson Flux Qubit," *Physical Review Letters* 91(9):1-4, Aug. 29, 2003.
Knysh and Smelyanskiy, "Adiabatic Quantum Computing in Systems with Constant Inter-Qubit Couplings," arXiv.org, URL=http://arxiv:quant-ph/0511131, pp. 1-10, Nov. 15, 2005.
Makhlin et al., "Quantum-state Engineering with Josephson-junction Devices," *Reviews of Modern Physics* 73:357-400, Apr. 2001.
Mooij et al., "Josephson Persistent-Current Qubit," *Science* 285:1036-1039, Aug. 13, 1999.
Mutzel, "Optimization in Graph Drawing," in Pardalos and Resende (eds.), *Handbook of Applied Optimization*, Oxford University Press, New York, 2002, pp. 967-977.
Nielsen and Chuang, *Quantum Computation and Quantum Information*, Cambridge University Press, Cambridge, 2000, Chapter 7.8, "Other Implementation Schemes," pp. 343-345.
Orlando et al., "Superconducting Persistent-current Qubit," *Physical Review B* 60(22):398-413, Dec. 1, 1999.
Shields and Sudborough, "Area Efficient Layouts of Binary Trees on One, Two Layers," Parallel and Distributed Computing and Systems, Anaheim, California, 2001.
Shirts and Pande, "Screen Savers of the World Unite!" *Science* 290(5498):1903-1904, Dec. 8, 2000.
Shor, "Introduction to Quantum Algorithms," arXiv.org, URL=http://arxiv:quant-ph/00005003, pp. 1-17, Jul. 6, 2001.

* cited by examiner

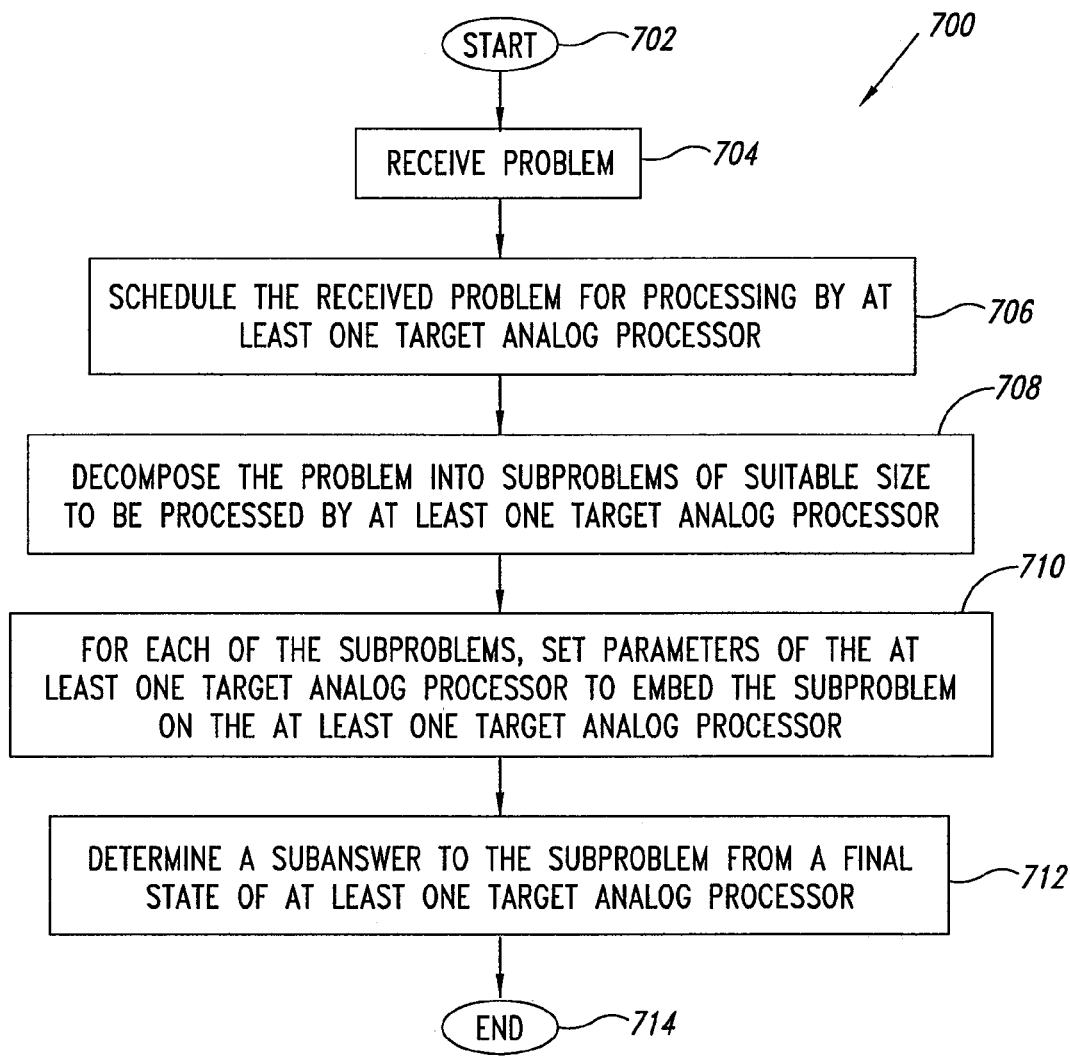

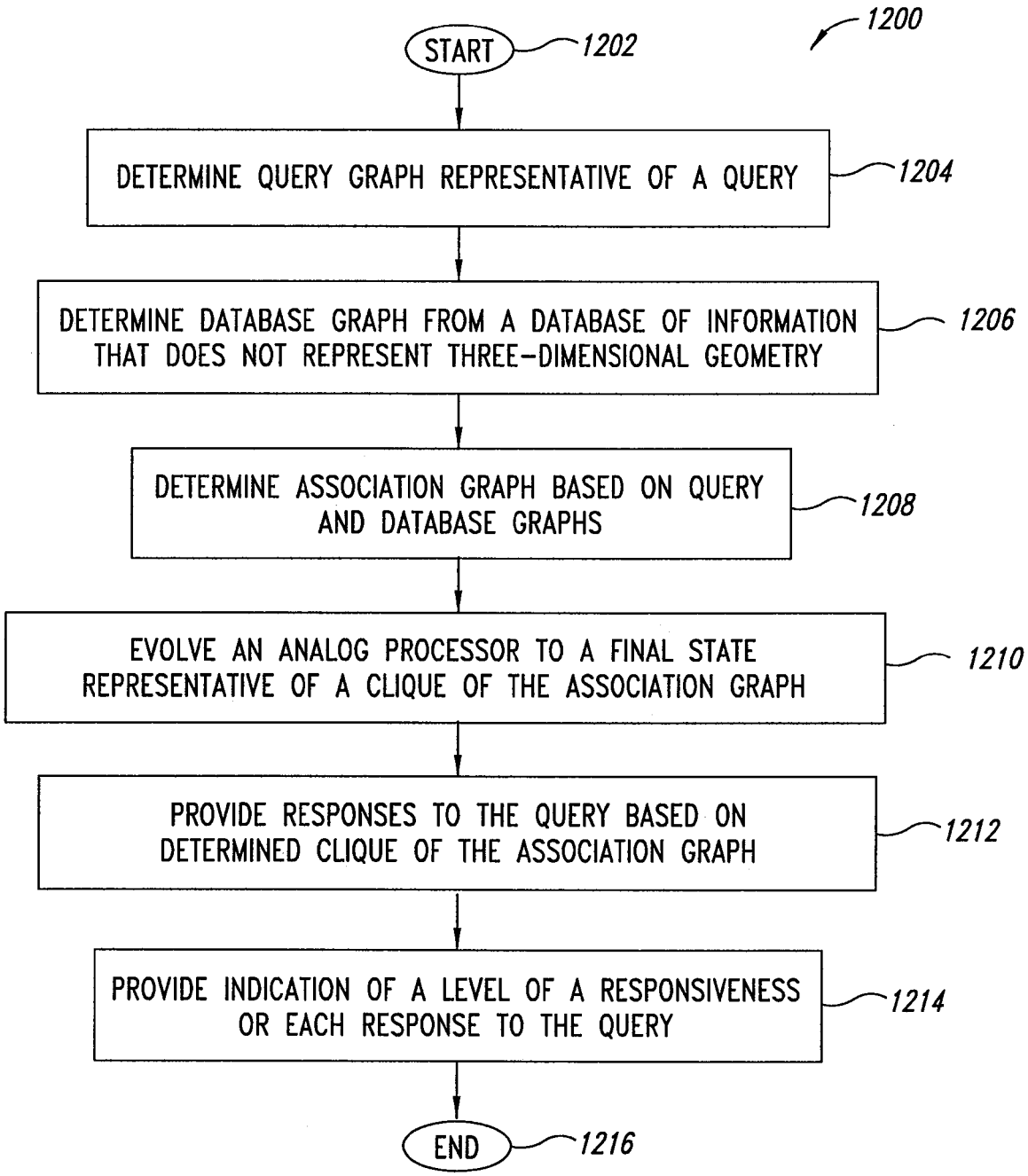

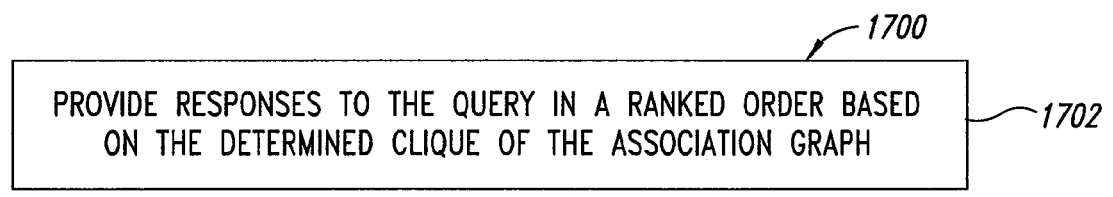
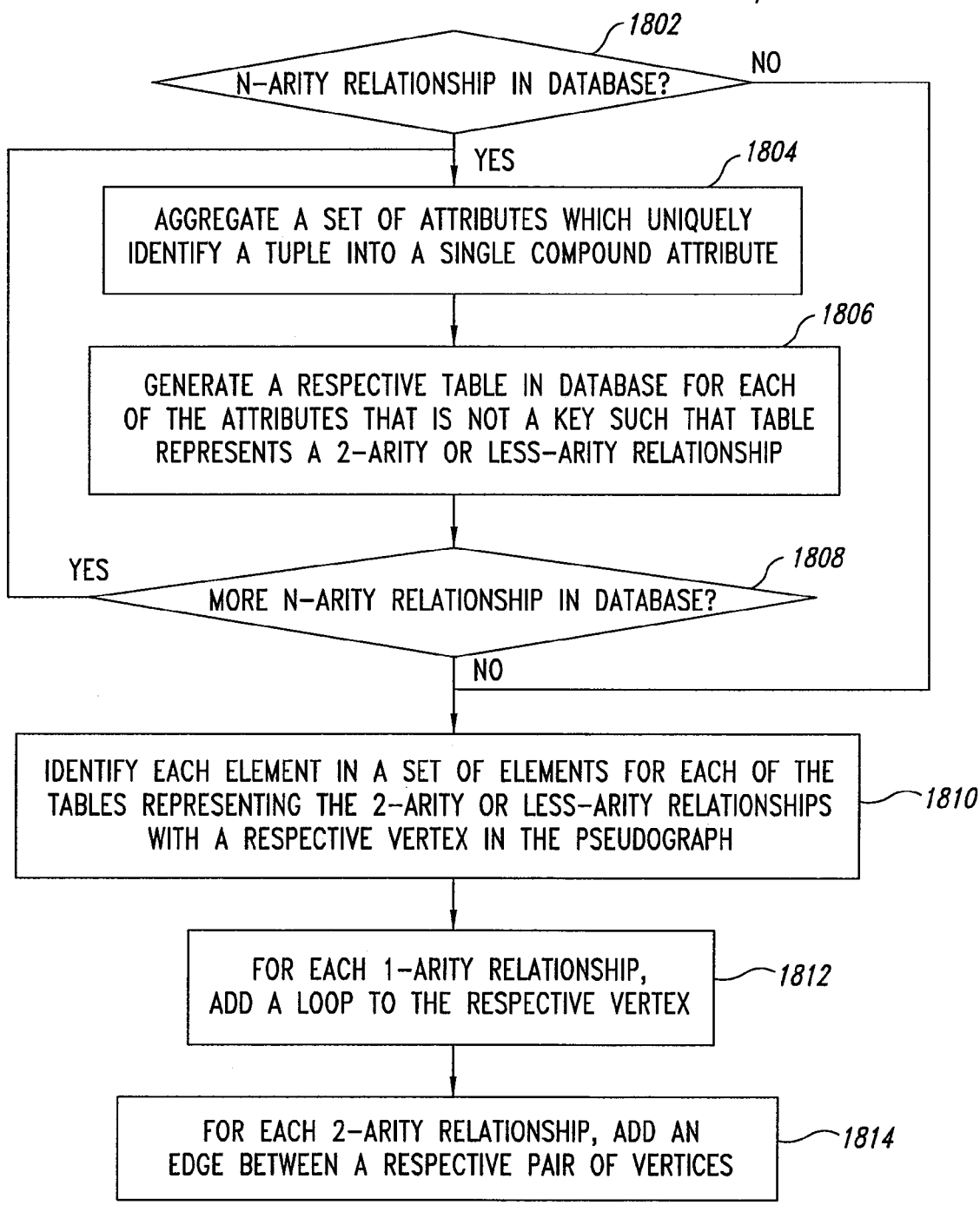

```
                                                    ┌─1900
                                                    ╱
┌─────────────────────────────────────────────────────────┐
│ GENERATE A 2-ARITY TABLE CONSISTING OF A COMPOUND ATTRIBUTE │──1902
│ AND AN ATTRIBUTE THAT IS NOT PART OF THE COMPOUND ATTRIBUTE │
└─────────────────────────────────────────────────────────┘
```

*FIG. 19*

```
                                                    ┌─2000
                                                    ╱
┌─────────────────────────────────────────────────────────┐
│  FOR EACH OF A NUMBER OF TABLES WITH A KEY AND MULTIPLE  │──2002
│   ATTRIBUTES, SPLIT THE TABLE INTO A SET OF TABLES EACH  │
│         CONSISTING OF A KEY AND A SINGLE ATTRIBUTE       │
└─────────────────────────────────────────────────────────┘
                              │
                              ▼
┌─────────────────────────────────────────────────────────┐
│ IDENTIFY EACH ELEMENT IN A SET OF ELEMENTS FOR EACH OF THE │
│ TABLES REPRESENTING 2-ARITY OR LESS-ARITY RELATIONSHIPS WITH │──2004
│         A RESPECTIVE VERTEX IN THE PSEUDOGRAPH           │
└─────────────────────────────────────────────────────────┘
                              │
                              ▼
         ┌──────────────────────────────────────┐
         │      FOR EACH 1-ARITY RELATIONSHIP,   │──2006
         │    ADD A LOOP TO THE RESPECTIVE VERTEX │
         └──────────────────────────────────────┘
                              │
                              ▼
         ┌──────────────────────────────────────┐
         │    FOR EACH 2-ARITY RELATIONSHIP, ADD  │──2008
         │  AN EDGE BETWEEN A RESPECTIVE PAIR OF VERTICES │
         └──────────────────────────────────────┘
```

*FIG. 20*

PROCESSING RELATIONAL DATABASE PROBLEMS USING ANALOG PROCESSORS

CROSS-REFERENCES TO RELATED APPLICATIONS

This application claims priority under 35 U.S.C. §119(e) from U.S. Provisional Patent Application Ser. No. 60/864,127, filed Nov. 2, 2006, which is incorporated herein by reference in its entirety.

BACKGROUND

1. Field

The present systems, methods and articles are generally related to the use of analog processors, for example quantum processors, and are related to the use of relational databases with such processors.

2. Description of the Related Art

A Turing machine is a theoretical computing system, described in 1936 by Alan Turing. A Turing machine that can efficiently simulate any other Turing machine is called a Universal Turing Machine (UTM). The Church-Turing thesis states that any practical computing model has either the equivalent or a subset of the capabilities of a UTM.

A quantum computer is any physical system that harnesses one or more quantum effects to perform a computation. A quantum computer that can efficiently simulate any other quantum computer is called a Universal Quantum Computer (UQC).

In 1981 Richard P. Feynman proposed that quantum computers could be used to solve certain computational problems more efficiently than a UTM and therefore invalidate the Church-Turing thesis. See e.g., Feynman R. P., "Simulating Physics with Computers", International Journal of Theoretical Physics, Vol. 21 (1982) pp. 467-488. For example, Feynman noted that a quantum computer could be used to simulate certain other quantum systems, allowing exponentially faster calculation of certain properties of the simulated quantum system than is possible using a UTM.

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Circuit model quantum computers have several serious barriers to practical implementation. In the circuit model, it is required that qubits remain coherent over time periods much longer than the single-gate time. This requirement arises because circuit model quantum computers require operations that are collectively called quantum error correction in order to operate. Quantum error correction cannot be performed without the circuit model quantum computer's qubits being capable of maintaining quantum coherence over time periods on the order of 1,000 times the single-gate time. Much research has been focused on developing qubits with coherence sufficient to form the basic information units of circuit model quantum computers. See e.g., Shor, P. W. "Introduction to Quantum Algorithms", arXiv.org:quant-ph/0005003 (2001), pp. 1-27. The art is still hampered by an inability to increase the coherence of qubits to acceptable levels for designing and operating practical circuit model quantum computers.

Another approach to quantum computation, involves using the natural physical evolution of a system of coupled quantum systems as a computational system. This approach does not make critical use of quantum gates and circuits. Instead, starting from a known initial Hamiltonian, it relies upon the guided physical evolution of a system of coupled quantum systems wherein the problem to be solved has been encoded in the terms of the system's Hamiltonian, so that the final state of the system of coupled quantum systems contains information relating to the answer to the problem to be solved. This approach does not require long qubit coherence times. Examples of this type of approach include adiabatic quantum computation, cluster-state quantum computation, one-way quantum computation, quantum annealing and classical annealing, and are described, for example, in Farhi, E. et al, "Quantum Adiabatic Evolution Algorithms versus Stimulated Annealing" arXiv.org:quant-ph/0201031 (2002), pp 1-24.

Qubits

As mentioned previously, qubits can be used as fundamental units of information for a quantum computer. As with bits in UTMs, qubits can refer to at least two distinct quantities; a qubit can refer to the actual physical device in which information is stored, and it can also refer to the unit of information itself, abstracted away from its physical device.

Qubits generalize the concept of a classical digital bit. A classical information storage device can encode two discrete states, typically labeled "0" and "1". Physically these two discrete states are represented by two different and distinguishable physical states of the classical information storage device, such as direction or magnitude of magnetic field, current, or voltage, where the quantity encoding the bit state behaves according to the laws of classical physics. A qubit also contains two discrete physical states, which can also be labeled "0" and "1". Physically these two discrete states are represented by two different and distinguishable physical states of the quantum information storage device, such as direction or magnitude of magnetic field, current, or voltage, where the quantity encoding the bit state behaves according to the laws of quantum physics. If the physical quantity that stores these states behaves quantum mechanically, the device can additionally be placed in a superposition of 0 and 1. That is, the qubit can exist in both a "0" and "1" state at the same time, and so can perform a computation on both states simultaneously. In general, N qubits can be in a superposition of $2^N$ states. Quantum algorithms make use of the superposition property to speed up some computations.

In standard notation, the basis states of a qubit are referred to as the $|0\rangle$ and $|1\rangle$ states. During quantum computation, the state of a qubit, in general, is a superposition of basis states so that the qubit has a nonzero probability of occupying the $|0\rangle$ basis state and a simultaneous nonzero probability of occupying the $|1\rangle$ basis state. Mathematically, a superposition of basis states means that the overall state of the qubit, which is denoted $|\Psi\rangle$, has the form $|\Psi\rangle=a|0\rangle+b|1\rangle$, where a and b are coefficients corresponding to the probabilities $|a|^2$ and $|b|^2$, respectively. The coefficients a and b each have real and imaginary components, which allows the phase of the qubit to be characterized. The quantum nature of a qubit is largely derived from its ability to exist in a coherent superposition of basis states and for the state of the qubit to have a phase. A qubit will retain this ability to exist as a coherent superposition of basis states when the qubit is sufficiently isolated from sources of decoherence.

To complete a computation using a qubit, the state of the qubit is measured (i.e., read out). Typically, when a measurement of the qubit is performed, the quantum nature of the qubit is temporarily lost and the superposition of basis states collapses to either the $|0\rangle$ basis state or the $|1\rangle$ basis state and thus regaining its similarity to a conventional bit. The actual state of the qubit after it has collapsed depends on the probabilities $|a|^2$ and $|b|^2$ immediately prior to the readout operation.

Superconducting Qubits

There are many different hardware and software approaches under consideration for use in quantum computers. One hardware approach uses integrated circuits formed of superconducting materials, such as aluminum or niobium. The technologies and processes involved in designing and fabricating superconducting integrated circuits are in some respects similar to those used for conventional integrated circuits.

Superconducting qubits are a type of superconducting device that can be included in a superconducting integrated circuit. Superconducting qubits can be separated into several categories depending on the physical property used to encode information. For example, they may be separated into charge, flux and phase devices, as discussed in, for example Makhlin et al., 2001, *Reviews of Modern Physics* 73, pp. 357-400. Charge devices store and manipulate information in the charge states of the device, where elementary charges consist of pairs of electrons called Cooper pairs. A Cooper pair has a charge of 2e and consists of two electrons bound together by, for example, a phonon interaction. See e.g., Nielsen and Chuang, *Quantum Computation and Quantum Information*, Cambridge University Press, Cambridge (2000), pp. 343-345. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed. See e.g., U.S. Pat. No. 6,838,694 and U.S. patent application Ser. No. 2005-0082519.

Quantum Processor

A computer processor may take the form of an analog processor, for instance a quantum processor such as a superconducting quantum processor. A superconducting quantum processor may include a number of qubits and associated local bias devices, for instance two or more superconducting qubits.

A superconducting quantum processor may include a number of coupling devices operable to selectively couple respective pairs of qubits. Examples of superconducting coupling devices include rf-SQUIDs and dc-SQUIDs, which couple qubits together by flux. SQUIDs include a superconducting loop interrupted by one Josephson junction (an rf-SQUID) or two Josephson junctions (a dc-SQUID). The coupling devices may be capable of both ferromagnetic and anti-ferromagnetic coupling, depending on how the coupling device is being utilized within the interconnected topology. In the case of flux coupling, ferromagnetic coupling implies that parallel fluxes are energetically favorable and anti-ferromagnetic coupling implies that anti-parallel fluxes are energetically favorable. Alternatively, charge-based coupling devices may also be used. Other coupling devices can be found, for example, in U.S. patent application Ser. No. 11/247,857 and U.S. Provisional Patent Application No. 60/886,253. Respective coupling strengths of the coupling devices may be tuned between zero and a maximum value, for example, to provide ferromagnetic or anti-ferromagnetic coupling between qubits.

Regardless of the specific hardware being implemented, managing a single qubit requires control over a number of parameters. Conventionally, this requirement necessitated outside communication (that is, communication from outside of the processor architecture) with individual qubits. However, since overall processing power increases with the number of qubits in the system, high capacity processors that exceed the abilities of conventional supercomputers must manage a large number of qubits and thus the conventional approach of employing outside control over multiple parameters on individual qubits requires a complicated system for programming qubit parameters.

Thus, the scalability of quantum processors is limited by the complexity of the qubit parameter control system and there remains a need in the art for a scalable qubit parameter control system.

Computational Complexity Theory

In computer science, computational complexity theory is the branch of the theory of computation that studies the resources, or cost, of the computation required to solve a given computational problem. This cost is usually measured in terms of abstract parameters such as time and space, called computational resources. Time represents the number of steps required to solve a problem and space represents the quantity of information storage required or how much memory is required.

Computational complexity theory classifies computational problems into complexity classes. The number of complexity classes is ever changing, as new ones are defined and existing ones merge through the contributions of computer scientists. The complexity classes of decision problems include:

1. P—The complexity class containing decision problems that can be solved by a deterministic UTM using a polynomial amount of computation time;
2. NP ("Non-deterministic Polynomial time")—The set of decision problems solvable in polynomial time on a non-deterministic UTM. Equivalently, it is the set of problems that can be "verified" by a deterministic UTM in polynomial time;
3. NP-hard (Nondeterministic Polynomial-time hard)—A problem H is in the class NP-hard if and only if there is an NP-complete problem L that is polynomial time Turing-reducible to H. That is to say, L can be solved in polynomial time by an oracle machine with an oracle for H;
4. NP-complete—A decision problem C is NP-complete if it is complete for NP, meaning that:
    (a) it is in NP and
    (b) it is NP-hard,
    i.e., every other problem in NP is reducible to it. "Reducible" means that for every problem L, there is a polynomial-time many-one reduction, a deterministic algorithm which transforms instances $l \in L$ into instances $c \in C$, such that the answer to c is YES if and only if the answer to l is YES. To prove that an NP problem A is in fact an NP-complete problem it is sufficient to show that an already known NP-complete problem reduces to A.

Decision problems have binary outcomes. Problems in NP are computation problems for which there exists a polynomial time verification. That is, it takes no more than polynomial time (class P) in the size of the problem to verify a potential solution. It may take more than polynomial time, however, to find a potential solution. NP-hard problems are at least as hard as any problem in NP.

Optimization problems are problems for which one or more objective functions are minimized or maximized over a set of variables, sometimes subject to a set of constraints. For example, the Traveling Salesman Problem ("TSP") is an optimization problem where an objective function representing, for example, distance or cost, must be optimized to find an itinerary, which is encoded in a set of variables representing the optimized solution to the problem. For example, given a list of locations, the problem may consist of finding the shortest route that visits all locations exactly once. Other examples of optimization problems include Maximum Independent Set, integer programming, constraint optimization, factoring, prediction modeling, and k-SAT. These problems are abstractions of many real-world optimization problems, such as operations research, financial portfolio selection, scheduling, supply management, circuit design, and travel route optimization. Many large-scale decision-based optimization problems are NP-hard. See e.g., "A High-Level Look at Optimization: Past, Present, and Future" e-Optimization.com, 2000.

Simulation problems typically deal with the simulation of one system by another system, usually over a period of time. For example, computer simulations can be made of business processes, ecological habitats, protein folding, molecular ground states, quantum systems, and the like. Such problems often include many different entities with complex inter-relationships and behavioral rules. In Feynman it was suggested that a quantum system could be used to simulate some physical systems more efficiently than a UTM.

Many optimization and simulation problems are not solvable using UTMs. Because of this limitation, there is need in the art for computational devices capable of solving computational problems beyond the scope of UTMs. In the field of protein folding, for example, grid computing systems and supercomputers have been used to try to simulate large protein systems. See Shirts et al., 2000, Science 290, pp. 1903-1904, and Allen et al, 2001, IBM Systems Journal 40, p. 310. The NEOS solver is an online network solver for optimization problems, where a user submits an optimization problem, selects an algorithm to solve it, and then a central server directs the problem to a computer in the network capable of running the selected algorithm. See e.g., Dolan et al, 2002, SIAM News Vol. 35, p. 6. Other digital computer-based systems and methods for solving optimization problems can be found, for example, in Fourer et al., 2001, Interfaces 31, pp. 130-150. All these methods are limited, however, by the fact they utilize digital computers, which are UTMs, and accordingly, are subject to the limits of classical computing that impose unfavorable scaling between problem size and solution time.

Graph Embedding

Graphs are an effective way of representing relationships among entities, and are commonly used in areas such as economics, mathematics, natural sciences and social sciences. While some graphs are simply used as a visual aid, others can be used to represent a problem to be solved. In fact, mapping a problem into graph format can sometimes help solve the problem. Instances of such problems include stock portfolio selection, microwave tower placement, delivery route optimization and other large-scale problems. Quantum computers can be used to solve such problems by way of translation of the original problem to a form that the quantum computer can solve. One method of doing this is through graph embedding, where a graph composed of a set of vertices and a set of edges that connect various vertices, representing a problem to be solved, is mapped into the qubit structure of a quantum processor and then solved.

Graph embedding is defining a particular drawing of a graph by mapping every node, or vertex, to a point on a plane and every edge to a straight or curved line that connects two nodes. This drawing is not unique, as there can be many permutations of the same graph. The number of ways a graph can be embedded depends on the characteristics and rules of the grid system upon which they are drawn. For example, one grid system can be a two-dimensional lattice. The edges may, for example, be constrained to be in two mutually orthogonal directions (e.g., up-down or left-right). Such a grid system has a connectivity of 4, meaning that each node can have at maximum four edges connected to it, the edges going only in the directions mentioned above. A similar grid system wherein edges can also extend diagonally (e.g., at 45°) and where they can cross is of connectivity 8. One form of graph embedding involves taking a graph drawn on one grid system and drawing an equivalent graph on another grid system.

Graphs that can be embedded can be broken into two types: planar and non-planar. Planar graphs are graphs that can be embedded on a two-dimensional plane such that no two edges intersect. A non-planar graph is a graph where at least two edges intersect. Some forms of graph embedding involve embedding a planar graph into a non-planar graph or attempting to make a non-planar graph as planar as possible, i.e., by reducing the number of intersections. However, some non-planar graphs cannot be embedded into a planar graph. The most famous examples of such graphs are the graphs K5 and K(3, 3). More information on non-planar graphs and their embeddings can be found in Boyer et al., 2004, Journal of Graph Algorithms and Applications 8, pp. 241-273.

One way of characterizing graph embeddings is their "efficiency", that is, the amount of resources (e.g., vertices and edges), area, and path lengths that an embedding uses. An efficient graph embedding uses fewer resources, has less area, has lower average path lengths, or any combination thereof between vertices than an inefficient graph embedding. Since the same graph can be embedded in more than one way, it is preferred to find the most efficient embedding possible. Finding the most efficient graph is also known as graph optimization.

For small graphs, finding the most efficient graph embedding might be quite easy and might be performed on a conventional processor in a reasonable amount of time. However, when the graph has a substantial number of vertices and edges, finding the most efficient graph embedding becomes a complex computational task. Several techniques have been developed to find an efficient graph embedding, such as that developed by Gutwenger et al., 2002, Lecture Notes in Computer Science 2269, pp. 307-323. The Automated Graph Drawing (AGD) software program described in that publication is capable of mapping and compacting graphs using a variety of different techniques. However, all these techniques rely on the planarization of the original graph, which means the original graph is redrawn to have as few, if any, crossings as possible. This comes at the expense of having longer edge lengths and greater surface area, since non-planar graphs are generally more compact.

Other forms of graph embedding are discussed in Mutzel, 2002, Handbook of Applied Optimization, Oxford University Press, New York, 2002, pp. 967-977. Mutzel describes many different methodologies for graph embedding and optimization, but again all concentrate on making the graph as planar as possible. Part of the reason Mutzel desires planarity is that it is aesthetically better. However, in instances where aesthetics is not an important aspect of graph optimization, the techniques outlined by Mutzel would not produce the most efficient graph embedding.

Graph embedding is also used in the field of very large scale integration (VLSI) chip design. Given an electronic circuit with many different elements that need to be wired together in a limited space and with specific design rules to be followed, finding an efficient wiring scheme is a form of graph embedding. Examples of applying graph embedding techniques to VLSI design can be found in Shields et al., 2001, *Parallel and Distributed Computing and Systems Conference*, Anaheim, Calif.; and Heckmann et al., 1991, Proc. 17th Int. Workshop on Graph-Theoretic Concepts in Comp. Sci., pp. 25-35. However, techniques for efficient wiring in chips are limited by the design rules and thus are usually not extendable to general forms of graph embedding.

A technique of graph embedding into a lattice of qubits is described in Knysh et al., 2005, arXiv.org:quant-ph/0511131. Knysh describes a technique of mapping NP-complete problems into a lattice of qubits and performing adiabatic quantum computation to solve the problem. However, Knysh uses constant couplings between qubits and only nearest neighbor couplings, both of which reduce the flexibility and efficiency of the embedding and subsequent computation.

State of the Art

Many entities employ relational databases to store information. The information may be related to almost any aspect of business, government or individuals. For example, the information may be related to human resources, transportation, order placement or picking, warehousing, distribution, budgeting, oil exploration, surveying, polling, images, geographic maps, network topologies, identification, and/or security.

A relational database stores a set of "relations" or "relationships." A relation is a two-dimensional table. The columns of the table are called attributes and the rows of the table store instances or "tuples" of the relation. A tuple has one element for each attribute of the relation. The schema of the relation consists of the name of the relation and the names and data types of all attributes. Typically, many such relations are stored in the database with any given relation having perhaps millions of tuples.

Searching databases typically employs the preparation of one or more queries. One common way of formatting queries is through Structured Query Language (SQL). QL-99 is the most recent standard, however many database vendors offer slightly different dialects or extensions of this standard. The basic query mechanism in SQL is the statement: SELECT L FROM R WHERE C, in which L identifies a list of columns in the relation(s) R, C is a condition that evaluates to TRUE, FALSE or UNKNOWN. Typically, only tuples that evaluate to TRUE are returned. Other query languages are also known, for example DATALOG, which may be particularly useful for recursive queries. Those of skill in the art will appreciate that while SQL or DATALOG are occasionally referred to herein, reference to a particular query language is for illustrative purposes only, and the present systems, methods and articles may be employed using any query language. Traditional querying or searching of databases presents a number of problems. Boolean matching is particularly onerous and unforgiving. Hence, searchers must specify a query that will locate the desired piece of information, without locating too much undesired information. Overly constrained queries will have no exact answer. Queries with insufficient constraints will have too many answers to be useful. Thus, the searcher must correctly constrain the query, with a suitable number of correctly selected constraints.

A common approach only identifies information that exactly corresponds to the constraints of the query. Another approach allows for inexact matches to some constraints. For example, the use of a wildcard character may be employed to locate variations of words being used in a query, for instance to capture both singular and plural occurrences of the word in the database. These approaches prove unsatisfactory in many situations. For example, it is common to have to reformulate a query numerous times before the results include the desired information, without including too much information. Often, it is not possible to form a satisfactory query that captures the desired information without capturing too much undesired information.

A further approach employs "fuzzy" matching capability. Such an approach typically replaces Boolean constraints with fuzzy counterparts. Thus, all tuples in the fuzzy or probabilistic database are directly or indirectly annotated with a number giving the probability or fuzziness level of the particular fact or piece of information. This approach disadvantageously requires the storage of a substantial amount of additional information.

These problems limit the usefulness of databases. This may particularly be a problem where queries are directed toward extracting useful knowledge from a large database of facts or other information.

BRIEF DESCRIPTION OF THE DRAWINGS

FIG. 7 is a flow diagram showing a method of operating a computing system to solve problems, according to at least one illustrated embodiment of the present systems, methods and articles.

FIG. 8 is a flow diagram showing a method of operating a processor controller to embed a graph representing a problem or query into an analog processor, according to at least one illustrated embodiment of the present systems, methods and articles.

FIG. 9 is a flow diagram showing a method of operating elements of a daemon layer to decompose a problem into subproblems, according to at least one illustrated embodiment of the present systems, methods and articles.

FIG. 11 is a flow diagram showing a method of operating the end user application interfaces to convert between an end user application format and a format suitable for a computing system, according to at least one illustrated embodiment of the present systems, methods and articles.

FIG. 12 is a flow diagram showing a method of to convert between an end user application format and a format suitable for a computing system to solve queries, according to at least one illustrated embodiment of the present systems, methods and articles.

FIG. 17 is a flow diagram showing a method of operating a computing system to provide results of a query in a ranked order, according to at least one illustrated embodiment of the present systems, methods and articles.

FIG. 18 is a flow diagram showing a method of operating a computing system to form an association graph with binary (i.e., 2-arity) or less-arity relations, according to at least one illustrated embodiment of the present systems, methods and articles.

FIG. 19 is a flow diagram showing a method of operating a computing system to generate a 2-arity (binary) table, according to at least one illustrated embodiment of the present systems, methods and articles.

FIG. 20 is a flow diagram showing a method of operating a computing system to form an association graph with 2-arity or less-arity relations, according to at least another illustrated embodiment of the present systems, methods and articles.

SUMMARY

Figure 1:
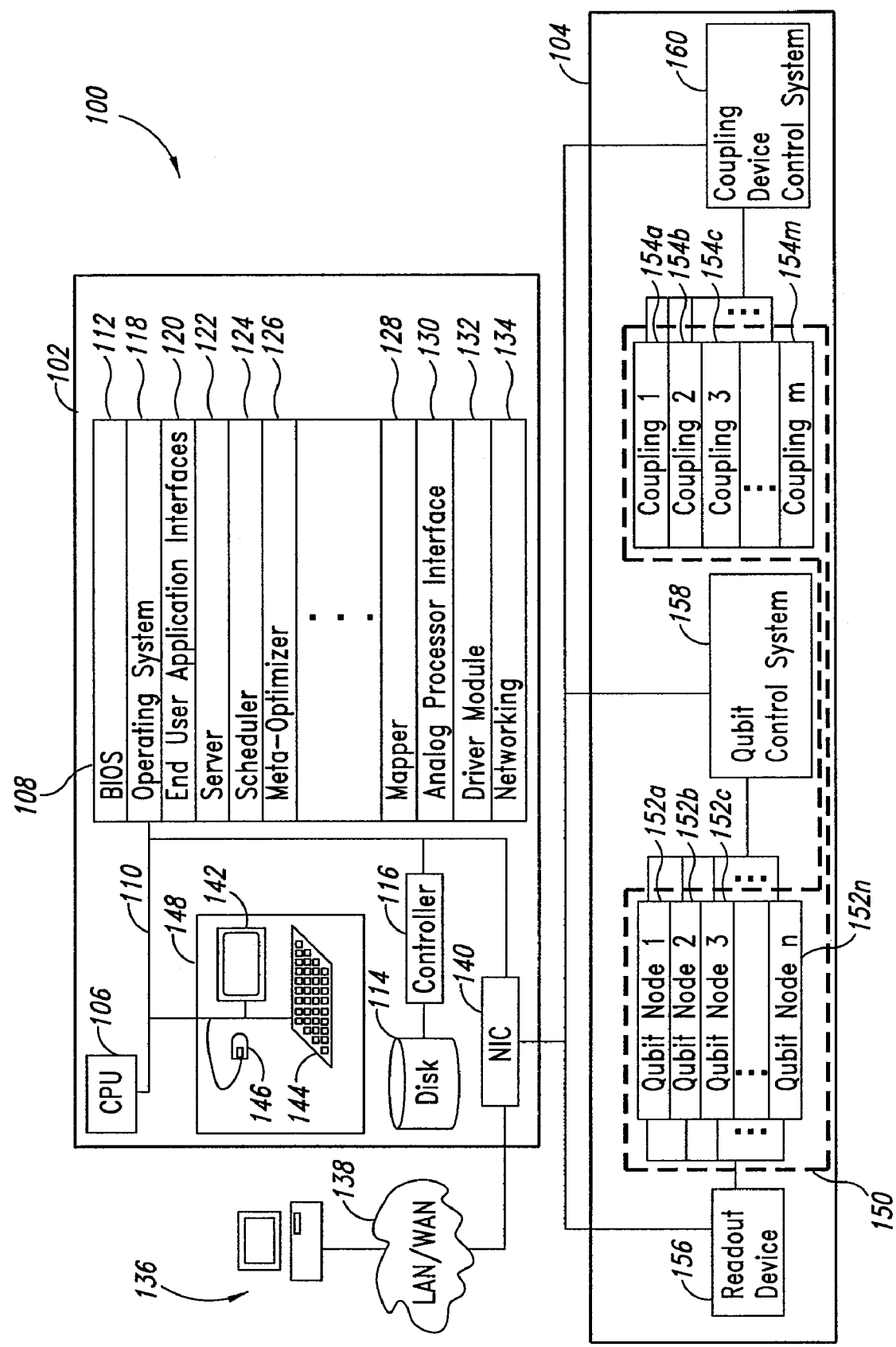
FIG. 1 is a functional block diagram showing a computing system employing at least one analog processor and a relational database, according to at least one illustrated embodiment of the present systems, methods and articles.

In one embodiment, method of obtaining answers to database queries includes determining a query graph representative of a query; determining an association graph based on the query graph and based on a database graph, the database graph representative of at least a portion of information stored in a database; and evolving an analog processor to a final state representative of a clique of the association graph.

The clique of the association graph may be a maximum clique. Evolving an analog processor to a final state representative of a clique of the association graph may include evolving a quantum processor into which the association graph has been embedded. Determining a query graph representative of a query may include converting a number of elements of information into a number of labeled nodes of a graph, and converting a number of relations between the elements of information into a number of labeled edges between pairs of nodes of the graph. Converting a number of relations between the elements of information into a number of labeled edges between pairs of the nodes of the graph may include converting the number of relations between the elements of information into a number of directed edges between pairs of nodes of the graph. Determining an association graph based on the query graph and based on a database graph may include, for all of a number of pairwise combinations of association vertices in the association graph, forming an edge between the association vertices in the association graph only if a respective pair of vertices in the query graph that the association vertices represent a same relation as a pair of vertices in the database graph that the association vertices represent. Determining a query graph may include determining a query graph for an over-constrained query. The portion of information stored in the database may be representative of at least two possible responses to the query. Evolving the analog processor to a final state representative of a clique of the association graph may include evolving the analog processor a plurality of times to a plurality of final states, each final state representative of a maximal clique of the association graph.

The method may further include ranking the plurality of final states according to a relative responsiveness of the clique associated with each final state. The method may further include providing a number of responses to the query in a ranked order based on a determined clique of the association graph. The method may further include determining the database graph from a database. Determining the database graph from a database may include forming the database graph from only a portion of the database.

In another embodiment, system operable to solve database queries includes at least one processor operable to execute instructions; at least one computer-readable medium storing instructions that cause the at least one processor to determine a query graph representative of a query and to determine an association graph based on the query graph and based on a database graph, the database graph representative of at least a portion of information stored in a database; an analog processor operable to evolve to a final state representative of a clique of the association graph; and a controller subsystem operable to embed the association graph into the analog processor.

The clique of the association graph may be a maximum clique. Determining a clique of the association graph may include evolving an analog processor. Determining a clique of the association graph may include evolving a quantum processor into which the association graph has been embedded. Determining a query graph representative of a query may include converting a number of elements of information into a number of labeled nodes of a graph, and converting a number of relations between the elements of information into a number of labeled edges between pairs of nodes of the graph. Converting a number of relations between the elements of information into a number of labeled edges between pairs of nodes of the graph may include converting the number of relations between the elements of information into a number of directed edges between pairs of the nodes of the graph. Determining an association graph based on the query graph and based on a database graph may include, for all of a number of pairwise combinations of association vertices in the association graph, forming an edge between the association vertices in the association graph only if a respective pair of vertices in the query graph that the association vertices represent a same relation as a pair of vertices in the database graph that the association vertices represent. Determining a query graph may include determining a query graph for an over-constrained query. The portion of information stored in the database may be representative of at least two possible responses to the query.

The method may include determining the database graph from a database. Determining the database graph from a database may include forming the database graph from only a portion of the database. The controller subsystem may be operable to set parameters of at least some of the qubits and the coupling devices. The system may further include a storage device storing the database. The database may store information that does not represent three-dimensional geometry.

The system may further include at least one of a server, a scheduler or a meta-optimizer.

In another embodiment, a computer-readable medium stores instructions for causing a processing system to solve database queries, by determining a query graph representative of a query; determining an association graph based on the query graph and based on a database graph, the database graph representative of at least a portion of information stored in a database; and evolving an analog processor to a final state representative of a clique of the association graph.

The analog processor may include a quantum processor including a plurality of qubits and a plurality of coupling devices coupling respective pairs of qubits and which is capable of natural physical evolution.

In another embodiment, a method of solving database queries includes determining a query graph representative of a query, the query graph including a number of nodes and a number of edges between pairs of nodes; determining an association graph based on the query graph and based on a database graph, the database graph representative of at least a portion of information stored in a database of information that does not represent three-dimensional geometry; and determining a clique of the association graph.

In another embodiment, a system operable to solve database queries includes at least one processor operable to execute instructions; and at least one computer-readable medium storing instructions that cause the at least one processor to determine a query graph representative of a query, determine an association graph based on the query graph and based on a database graph, the database graph representative of at least a portion of information stored in a database of information that does not represent three-dimensional geometry, and determine a clique of the association graph.

The at least one processor may include an analog processor operable to evolve to a final state representative of the clique of the association graph. The analog processor may include a quantum processor including a plurality of qubits and a plurality of coupling devices coupling respective pairs of qubits and wherein the quantum processor is capable of natural physical evolution, the system may further comprise: a controller subsystem operable to set parameters of at least some of the qubits and coupling devices. The at least one processor may include a digital processor operable to determine the query graph by converting a number of elements of information into a number of labeled nodes of a graph, and converting a number of relations between the elements of information into a number of labeled edges between pairs of nodes of the graph. The at least one processor may include a digital processor operable to determine the association graph by: for all of a number of pairwise combinations of association vertices in the association graph, forming an edge between the association vertices in the association graph only if a respective pair of vertices in the query graph that the association vertices represent a same relation as a pair of vertices in the database graph that the association vertices represent. The portion of information stored in the database may be representative of at least two possible responses to the query.

In another embodiment, a method of converting a database including at least one n-arity relation, where n is greater than 2, into a labeled database pseudograph includes for each n-arity relation, aggregating a set of attributes which uniquely identify a tuple into a single compound attribute; and generating a respective table in the database for each of the attributes that is not a key such that each table in the database represents a 2-arity or less-arity relation; identifying each element in a set of elements for each of the tables representing a 2-arity or less-arity relation with a respective vertex in the pseudograph; for each 1-arity relation, adding a loop to the respective vertex; and for each 2-arity relation, adding an edge between a respective pair of vertices.

In another embodiment, a computer-readable medium stores instructions for causing at least one processor to convert a database including at least one n-arity relation, where n is greater than 2, into a labeled database pseudograph, by for each n-arity relation, aggregating a set of attributes which uniquely identify a tuple into a single compound attribute; and generating a respective table in the database for each of the attributes that is not a key such that each table in the database represents a 2-arity or less-arity relation; identifying each element in a set of elements for each of the tables representing a 2-arity or less-arity relation with a respective vertex in the pseudograph; for each 1-arity relation, adding a loop to the respective vertex; and for each 2-arity relation, adding an edge between a respective pair of vertices.

In another embodiment, a method of converting a database including at least one n-arity relation, where n is greater than 2, into a labeled database pseudograph includes for each of a number of tables having a key and multiple attributes, splitting the table into a set of tables each consisting of a key and a single attribute; identifying each element in a set of elements for each of the tables representing a 2-arity or less-arity relation with a respective vertex in the pseudograph; for each 1-arity relation, adding a loop to the respective vertex; and for each 2-arity relation, adding an edge between a respective pair of vertices.

Generating a respective table in the database for each of the attributes that is not a key such that each table in the database represents a 2-arity or less-arity relation may include generating a 2-arity table consisting of a compound attribute and an attribute that is not part of the compound attribute.

In another embodiment, a computer-readable medium stores instructions for causing at least one processor to convert a database including at least one n-arity relation into a labeled database pseudograph, where n is greater than 2, by for each of a number of tables having a key and multiple attributes, splitting the table into a set of tables each consisting of a key and a single attribute; identifying each element in a set of elements for each of the tables representing a 2-arity or less-arity relation with a respective vertex in the pseudograph; for each 1-arity relation, adding a loop to the respective vertex; and for each 2-arity relation, adding an edge between a respective pair of vertices.

Generating a respective table in the database for each of the attributes that is not a key such that each table in the database represents a 2-arity or less-arity relation may include generating a 2-arity table consisting of a compound attribute and an attribute that is not part of the compound attribute.

In another embodiment, a system to process queries of databases includes an analog processor; a conversion subsystem that receives a problem and parses the problem into subproblems suitable for processing by the analog processor; and a controller subsystem that receives the subproblems and is operable to set at least one parameter of the analog processor to embed the subproblems into the analog processor.

The analog processor may include a quantum processor including a plurality of qubits and a plurality of coupling devices coupling respective pairs of qubits, the quantum processor being capable of natural physical evolution and wherein the controller subsystem is operable to set parameters of at least some of the qubits and the coupling devices. The conversion subsystem may include a server configured to receive the problem and to provide at least one answer to the problem based on the processing of the subproblems by the analog processor. The server may be configured to receive multiple problems and the conversion subsystem may further include a scheduler configured to schedule the received problems for processing by the analog processor. The conversion subsystem may include a meta-optimizer configured to facilitate the parsing of the problem into subproblems. The conversion subsystem may further be operable to convert an output parameter of the analog processor into a respective subanswer of a respective subproblem. The conversion subsystem is may further be operable to determine whether the subanswer is valid, and to resubmit the subproblem if the subanswer is determined to be invalid. The conversion subsystem may further be operable to determine whether all subproblems have valid subanswers, and to combine a plurality of subanswers to the subproblems into an answer to the problem if all of the subproblems have valid subanswers. The conversion subsystem may further be operable to determine whether the answer to the problem is adequate, and to resubmit the problem if the answer is determined to be inadequate. The conversion subsystem may further be operable to determine if a subsequent answer to the problem is better than a previous answer to the problem, and to store the subsequent answer if the subsequent answer is determined to be better than the previous answer. The conversion subsystem may further be operable to combine a plurality of subanswers to the subproblems into an answer to the problem. The system may further include a memory storing a set of instructions to interface with an end user application. The memory may be local with respect to the conversion subsystem. The memory may be local with respect to the end user application.

In another embodiment, a method of processing queries of databases includes receiving a problem; parsing the problem into subproblems of suitable size to be processed by an analog processor; for each of the subproblems, setting a number of parameters of the analog processor to embed the subproblem into the analog processor; determining a subanswer to the subproblem from a final state of the analog processor.

The analog processor may include at least one quantum processor including a plurality of qubits and a plurality of coupling devices coupling respective pairs of qubits, the at least one quantum processor capable of evolving to the final state, and wherein setting a number of parameters of the analog processor to embed the subproblem into the analog processor may include setting parameters of at least some of the qubits and the coupling devices. The method may further include evolving the quantum processor to the final state. The method may further include scheduling the received problem for processing by the analog processor. Parsing the problem into subproblems of suitable size to be processed by the analog processor may include optimizing the subproblems for processing on the analog processor. The method may include converting parameters of the analog processor into subanswers to the subproblems. The method may include determining whether at least one of a number of subanswers is valid or invalid; and resubmitting a respective subproblem if the respective subanswer is determined to be invalid. The method may further include determining whether all subproblems have a respective subanswer; and combining the subanswers to the subproblems into an answer to the problem if all of the subproblems have subanswers. The method may further include determining whether an answer to a problem is adequate; and resubmitting the problem for processing by the analog processor if the answer is determined to be inadequate. The method may further include determining if an answer to the problem is better than a previous answer to the problem; and storing the answer if the answer is determined to be better than the previous answer to the problem. The method may further include converting a problem from an end user application format into a generalized format.

DETAILED DESCRIPTION

In the following description, certain specific details are set forth in order to provide a thorough understanding of various embodiments of the present systems, methods and articles. However, one skilled in the art will understand that the present systems, methods and articles may be practiced without these details. In other instances, well-known structures associated with analog processors, such as quantum processors, quantum devices, coupling devices and control systems including microprocessors and drive circuitry have not been shown or described in detail to avoid unnecessarily obscuring descriptions of the embodiments of the present systems, methods and articles. Unless the context requires otherwise, throughout the specification and claims which follow, the words "comprise" and "include" and variations thereof, such as, "comprises", "comprising", "includes" and "including" are to be construed in an open, inclusive sense, that is, as "including, but not limited to." Reference throughout this specification to "one embodiment", "an embodiment", "one alternative", "an alternative" or similar phrases means that a particular feature, structure or characteristic described is included in at least one embodiment of the present systems, methods and articles. Thus, the appearances of such phrases in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the claimed invention.

As described herein, one or more "best" answers to a query may be provided, for example, where there is no exact answer to the query. "Best" is a relative term that may depend, for example, on how closely an answer correlates to the query. Thus, as also described herein, an indication of how closely an answer correlates to the query may be provided, in other words a measure of the responsiveness of the answer to the query may be provided. Such may be determined, for example, by scoring answers based on the number of mutually consistent facts in the returned answer that match the query. Thus, a ranking may be established based on a number of relaxations made to the query in order to achieve the respective answer. As further described herein, relaxation of constraints may be automatically implemented, without the need to reformulate a query or to use wildcard characters. These aspects may be particularly useful in solving problems using information stored in a database. For example, these aspects may eliminate or reduce the need to reformulate queries, or may provide additional relevant information that would not have been provided under traditional approaches. Further, a fuzzy or probabilistic approach, such as that discussed in the background section above, may be employed in addition to the automatic relaxation of constraints described herein. While relaxing of constraints is possible using digital processors, such is too computationally expensive for most practical applications. However, analog processors, for example quantum processors, may advantageously perform such via determining a clique of a graph.

System Hardware

FIG. 1 and the following discussion provide a brief and general description of a suitable computing environment in which various embodiments of the computing system may be implemented. Although not required, embodiments will be described in the general context of computer-executable instructions, such as program application modules, objects or macros being executed by a computer. Those skilled in the relevant art will appreciate that the disclosed systems, methods and articles can be practiced with other computing system configurations, including hand-held devices, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

FIG. 1 shows a computing system 100 operable to solve problems with queries of one or more relational databases, according to one illustrated embodiment.

The computing system 100 includes a digital computing subsystem 102 and an analog computing subsystem 104 communicatively coupled to the digital computing subsystem 102.

The digital computing subsystem 102 includes one or more processing units 106, system memories 108, and system buses 110 that couple various system components including the system memory 108 to the processing unit 106. The digital computing subsystem 102 will at times be referred to in the singular herein, but this is not intended to limit the application to a single digital computing subsystem 102 since in typical embodiments, there will be more than one digital computing subsystem 102 or other device involved. Other computing systems may be employed, such as conventional and personal computers, where the size or scale of the system allows. The processing unit 106 may be any logic processing unit, such as one or more central processing units ("CPUs"), digital signal processors ("DSPs"), application-specific integrated circuits ("ASICs"), etc. Unless described otherwise, the construction and operation of the various blocks shown in FIG. 1 are of conventional design. As a result, such blocks need not be described in further detail herein, as they will be understood by those skilled in the relevant art.

The system bus 110 can employ any known bus structures or architectures, including a memory bus with memory controller, a peripheral bus, and a local bus. The system memory 108 may include read-only memory ("ROM") and random access memory ("RAM"). A basic input/output system ("BIOS") 112, which can form part of the ROM, contains basic routines that help transfer information between elements within the digital computing subsystem 102, such as during startup.

The digital computing subsystem 102 also includes non-volatile memory 114. The non-volatile memory 114 may take a variety of forms, for example a hard disk drive for reading from and writing to a hard disk, and an optical disk drive and a magnetic disk drive for reading from and writing to removable optical disks and magnetic disks, respectively. The optical disk can be read by a CD-ROM, while the magnetic disk can be a magnetic floppy disk or diskette. The hard disk drive, optical disk drive and magnetic disk drive communicate with the processing unit 106 via the system bus 110. The hard disk drive, optical disk drive and magnetic disk drive may include appropriate interfaces or controllers 116 coupled between such drives and the system bus 110, as is known by those skilled in the relevant art. The drives, and their associated computer-readable media, provide non-volatile storage of computer readable instructions, data structures, program modules and other data for the digital computing subsystem 102. Although the depicted digital computing subsystem 102 has been described as employing hard disks, optical disks and/or magnetic disks, those skilled in the relevant art will appreciate that other types of non-volatile computer-readable media that can store data accessible by a computer may be employed, such a magnetic cassettes, flash memory cards, digital video disks ("DVD"), Bernoulli cartridges, RAMs, ROMs, smart cards, etc.

Various program modules or application programs and/or data can be stored in the system memory 108. For example, the system memory 108 may store an operating system 118, end user application interfaces 120, server applications 122, scheduler modules 124, and/or meta-optimizer modules 126. Also for example, the system memory 108 may additionally or alternatively store one or more mapper modules 128, analog processor interface modules 130, and/or driver modules 132. The operation and function of these modules are discussed in detail below.

The system memory 108 may also include one or more networking applications 134, for example a Web server application and/or Web client or browser application for permitting the digital computing subsystem 102 to exchange data with sources via the Internet, corporate Intranets, or other networks as described below, as well as with other server applications on server computers such as those further discussed below. The networking application 134 in the depicted embodiment is markup language based, such as hypertext markup language ("HTML"), extensible markup language ("XML") or wireless markup language ("WML"), and operates with markup languages that use syntactically delimited characters added to the data of a document to represent the structure of the document. A number of Web server applications and Web client or browser applications are commercially available such those available from Mozilla and Microsoft.

While shown in FIG. 1 as being stored in the system memory 108, the operating system 118 and various applications 120, 122, 124, 126, 128, 130, 132, 134 and/or data can be stored on the hard disk of the hard disk drive, the optical disk of the optical disk drive and/or the magnetic disk of the magnetic disk drive.

The digital computing subsystem 102 can operate in a networked environment using logical connections to one or more end user computing systems 136 (only one shown), such as one or more remote computers or networks. The digital computing subsystem 102 may be logically connected to one or more end user computing systems 136 under any known method of permitting computers to communicate, for example through a network 138 such as a local area network ("LAN") and/or a wide area network ("WAN") including, for example, the Internet. Such networking environments are well known including wired and wireless enterprise-wide computer networks, intranets, extranets, and the Internet. Other embodiments include other types of communication networks such as telecommunications networks, cellular networks, paging networks, and other mobile networks. The information sent or received via the communications channel may, or may not be encrypted. When used in a LAN networking environment, the digital computing subsystem 102 is connected to the LAN through an adapter or network interface card 140 (communicative linked to the system bus 110). When used in a WAN networking environment, the digital computing subsystem 102 may include an interface and modem (not shown) or other device, such as the network interface card 140, for establishing communications over the WAN/Internet.

In a networked environment, program modules, application programs, or data, or portions thereof, can be stored in the digital computing subsystem 102 for provision to the networked computers. In one embodiment, the digital computing subsystem 102 is communicatively linked through the network 138 with TCP/IP middle layer network protocols; however, other similar network protocol layers are used in other embodiments, such as user datagram protocol ("UDP"). Those skilled in the relevant art will readily recognize that the network connections shown in FIG. 1 are only some examples of establishing communications links between computers, and other links may be used, including wireless links.

While in most instances the digital computing subsystem 102 will operate automatically, where an end user application interface is provided, an operator can enter commands and information into the digital computing subsystem 102 through the end user application interface 148 including input devices, such as a keyboard 144, and a pointing device, such as a mouse 146. Other input devices can include a microphone, joystick, scanner, etc. These and other input devices are connected to the processing unit 106 through the end user application interface 120, such as a serial port interface that couples to the system bus 110, although other interfaces, such as a parallel port, a game port, or a wireless interface, or a universal serial bus ("USB") can be used. A monitor 142 or other display device is coupled to the bus 110 via a video interface, such as a video adapter (not shown). The digital computing subsystem 102 can include other output devices, such as speakers, printers, etc.

The analog computing subsystem 104 includes an analog processor, for example, a quantum processor 150. The quantum processor 150 includes multiple qubit nodes 152a-152n (collectively 152) and multiple coupling devices 154a-154m (collectively 154).

The analog computing subsystem 104 includes a readout device 156 for reading out one or more qubit nodes 152. For example, readout device 156 may include multiple dc-SQUID magnetometers, with each dc-SQUID magnetometer being inductively connected to a qubit node 152 and NIC 140 receiving a voltage or current from readout device 156. The dc-SQUID magnetometers comprise a loop of superconducting material interrupted by two Josephson junctions and are well known in the art.

The analog computing subsystem 104 also includes a qubit control system 158 including controller(s) for controlling or setting one or more parameters of some or all of the qubit nodes 152. The analog computing subsystem 104 further includes a coupling device control system 160 including coupling controller(s) for coupling devices 154. For example, each coupling controller in coupling device control system 160 may be capable of tuning the coupling strength of a coupling device 154 between a minimum and a maximum value. Coupling devices 154 may be tunable to provide ferromagnetic or anti-ferromagnetic coupling between qubit nodes 152.

Where computing system 100 includes a driver module 132, the driver module 132 may include instructions to output signals to quantum processor 150. NIC 140 may include appropriate hardware required for interfacing with qubit nodes 152 and coupling devices 154, either directly or through readout device 156, qubit control system 158, and/or coupling device control system 160. Alternatively, NIC 140 may include software and/or hardware that translate commands from driver module 132 into signals (e.g., voltages, currents, optical signals, etc.) that are directly applied to qubit nodes 152 and coupling devices 154. In another alternative, NIC 140 may include software and/or hardware that translates signals (representing a solution to a problem or some other form of feedback) from qubit nodes 152 and coupling devices 154. In some cases, analog processor interface module 130 may communicate with driver module 132 rather than directly with NIC 140 in order to send and receive signals from quantum processor 150.

The functionality of NIC 140 can be divided into two classes of functionality: data acquisition and control. Different types of chips may be used to handle each of these discrete functional classes. Data acquisition is used to measure the physical properties of qubit nodes 152 after quantum processor 150 has completed a computation. Such data can be measured using any number of customized or commercially available data acquisition micro-controllers including, but not limited to, data acquisition cards manufactured by Elan Digital Systems (Fareham, UK) including the AD132, AD136, MF232, MF236, AD142, AD218 and CF241 cards. Alternatively, data acquisition and control may be handled by a single type of microprocessor, such as the Elan D403C or D480C. There may be multiple NICs 140 in order to provide sufficient control over qubit nodes 152 and coupling devices 154 and in order to measure the results of a computation conducted on quantum processor 150.

Figure 2:
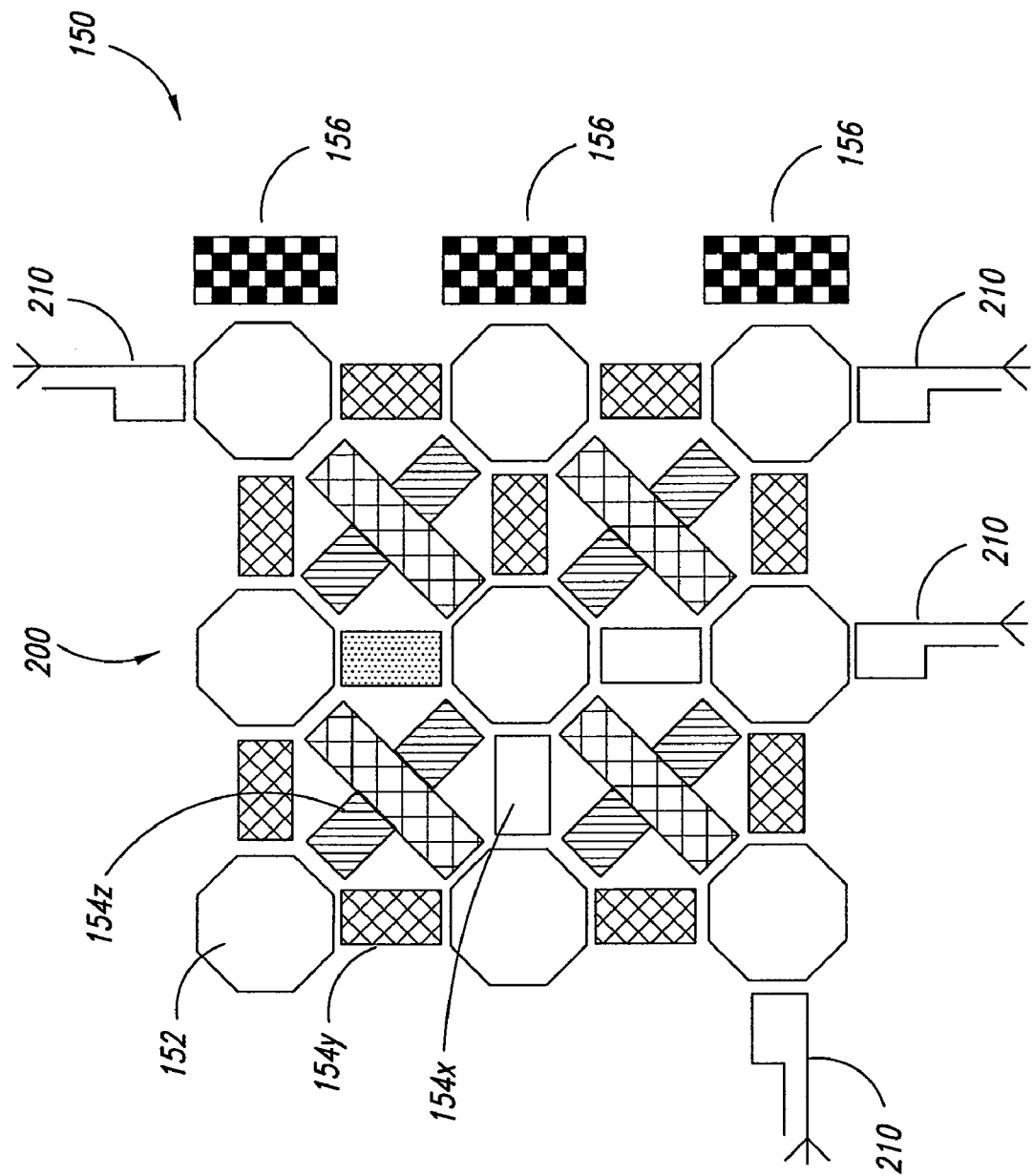
FIG. 2 is a schematic diagram showing an analog processor in the form of a quantum processor comprising a two-dimensional lattice of qubits, according to at least one illustrated embodiment of the present systems, methods and articles.

FIG. 2 shows an embodiment of a quantum processor 150 in the form of a two-dimensional lattice 200 of qubits 152, where at least some of the qubits 152 can be coupled to their nearest neighbors, their next-nearest neighbors, or both their nearest and next-nearest neighbors via coupling devices 154. The qubits 152 are arranged in a grid pattern and are coupled to each other by coupling devices 154. Two types of coupling devices 154 are illustrated: coupling devices 154x, 154y, arranged along primary orthogonal axes (e.g., the horizontal or vertical axes respectively in FIG. 2) of the lattice 200 and which couple qubits 152 to their nearest neighbors, and coupling devices 154z, arranged diagonally in lattice 200 and which couple qubits 152 to their next-nearest neighbors. Nearest neighbor qubits are those qubits that are closest in distance to an arbitrary qubit 152 in the lattice 200. Next-nearest neighbor qubits are those qubits that are closest in distance to an arbitrary qubit 152 in lattice 200 if the nearest neighbors of the arbitrary qubit 152 are removed from consideration. Those of skill in the relevant art will appreciate that the lattice 200 of the quantum processor 150 is extendable to any number of qubits 152 and coupling devices 154.

Coupling devices 154 may either couple qubits 152 together ferromagnetically or anti-ferromagnetically or not couple qubits 152 together. A ferromagnetic coupling between two qubits 152 drives the qubits 152 to have the same state, whereas an anti-ferromagnetic coupling drives the qubits 152 to have opposite states. Charge-based coupling devices 154 may also be used. More information on coupling devices 154 useful in the present systems, methods and articles can be found in U.S. patent application Ser. No. 11/247,857.

The lattice 200 may also include a set of local bias devices 210. While FIG. 2 shows four bias devices, those skilled in the art will appreciate that in some embodiments each qubit 152 in lattice 200 may have an associated bias device. Bias devices 210 provide a bias signal for qubits 152, and may provide a flux bias and/or a charge bias for the qubits 152. The lattice 200 may also include a set of readout devices 156, used to measure the state of qubits 152. Only three readout devices 156 are illustrated in FIG. 2, but any number of readout devices may be present in the lattice 200. For example, each qubit 152 in the lattice 200 may have an associated readout device, or alternatively, only qubits 152 along one or more outside edge of the lattice 200 may have an associated readout device, e.g., with the states of the interior qubits being copied to the outer qubits in order to be measured (see, for example, U.S. patent application Ser. No. 11/411,051). The interior qubits 152 of lattice 200 may have a connectivity of eight. However, those skilled in the art will appreciate that the structure of the lattice 200 is not so limited, and that lattice 200 may be arranged so that certain qubits (interior or exterior) have a different connectivity, such as 2 or 4.

The analog computing subsystem 104 may be a superconducting quantum computer, examples of which include qubit registers, readout devices and ancillary devices. Superconducting quantum computers normally are operated at milliKelvin temperatures and often are operated in a dilution refrigerator. An example of a dilution refrigerator is the Leiden Cryogenics B.V. MNK 126 series (Galgewater No. 21, 2311 VZ Leiden, The Netherlands). All or part of the components of the analog computing subsystem 104 may be housed in the dilution refrigerator. For example, qubit control system 158 and coupling device control system 160 may be housed outside the dilution refrigerator with the quantum processor 150 being housed inside the dilution refrigerator.

As described herein, the present systems, methods and articles may be employed to embed an association graph into a lattice of qubits 152, such as lattice 200, with the vertices of the association graph being represented by qubits 152 and the edges of the association graph being represented by coupling devices 154. The qubits 152 and coupling devices 154 may be superconducting devices. The association graph may be based on a query graph representing the query and a database graph representing the database or portion thereof. The query corresponding to the association graph may be solved as a clique problem using the quantum processor 150. For example, the quantum processor may be evolved from a first or "initial" state to a second or "final" state, with the final state being representative of an arbitrary clique of the association graph or alternatively, a maximal clique or a maximum clique of the association graph.

Superconducting qubits useful in the present systems, methods and articles include superconducting flux qubits and superconducting charge qubits, both described in Makhlin et al., 2001, *Reviews of Modern Physics* 73, pp. 357-400. Examples of flux qubits that can be used include rf-SQUIDs, which have a superconducting loop interrupted by a Josephson junction, and persistent current qubits, which have a superconducting loop interrupted by three Josephson junctions. See Mooij et al., 1999, *Science* 285, 1036; and Orlando et al., 1999, *Phys. Rev. B* 60, 15398. Other examples of superconducting qubits can be found in Il'ichev et al., 2003, *Phys. Rev. Lett.* 91, 097906; Blatter et al., 2001, *Phys. Rev. B* 63, 174511; and Friedman et al., 2000, *Nature* 406, 43. In addition, hybrid charge-phase qubits may also be used, and examples of hybrid qubits can be found in U.S. Pat. No. 6,838,694 and US 2005-0082519, referred to above.

Superconducting coupling devices useful in the present systems, methods and articles include rf-SQUIDs and dc-SQUIDs, which couple qubits together by flux. As described previously, SQUIDs have a superconducting loop interrupted by one (an rf-SQUID) or two (a dc-SQUID) Josephson junctions. In some cases, the coupling devices used may be capable of both ferromagnetic and anti-ferromagnetic coupling.

The readout devices 156, may also be superconducting devices, such as a dc-SQUID, or instead, a tank circuit may be used for the readout devices 156. The readout devices 156 may read out the state of a qubit 152 in the flux regime, or alternatively, read out the state of the qubit in the charge regime. The bias devices 210 may include a loop of metal in proximity to a superconducting qubit 152 that provides an external flux bias to the qubit, and may include one or more Josephson junctions. Charge-based readout devices and charged-based local bias devices may be used.

System Logic

Figure 3:
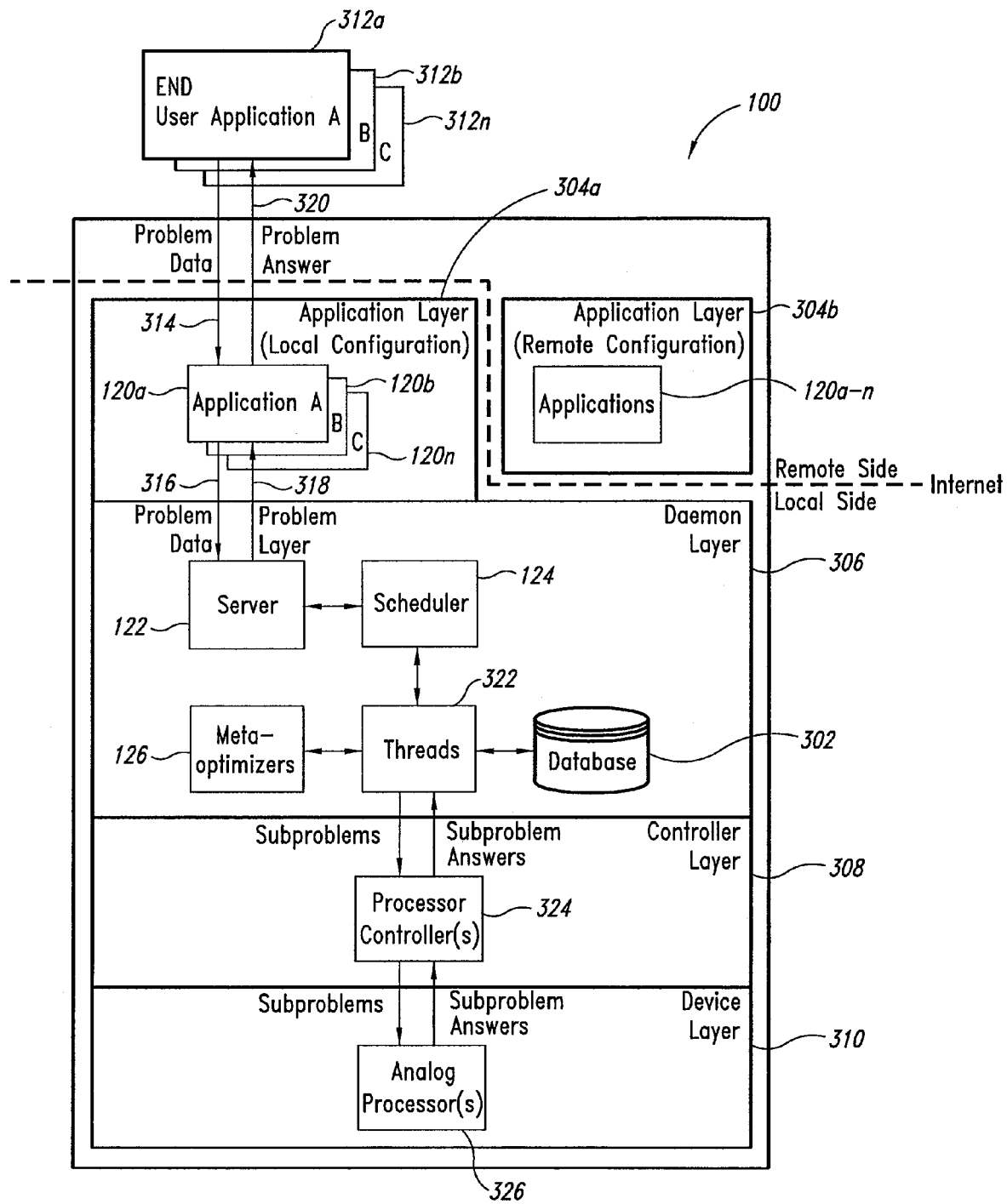
FIG. 3 is a schematic diagram showing an architecture of a computing system including a number of layers and the inter-operation of various software, firmware and hardware modules of the computing system, according to at least one illustrated embodiment of the present systems, methods and articles.

FIG. 3 shows an exemplary embodiment of the computing system 100, illustrating an architecture including multiple layers and interaction between various software, firmware and/or hardware elements, according to one illustrated embodiment. As explained in detail below, a graph, for example an association graph, may be formed, for example based on a query graph representing a query and a database graph representing a database or portion thereof. The association graph may be embedded into a quantum processor 150 (FIG. 1), which is evolved to a final state to solve the association graph as a clique problem.

The computing system 100 is logically partitioned into four distinct layers, three layers that may be predominately software: an application layer 304a, 304b (collectively 304), daemon layer 306, controller layer 308, and a layer that may be predominately hardware: device layer 310. The operation and interrelation of the layers 304, 306, 308 and 310 are described below.

A number of program modules and data structures may be stored and processed by computing system 100 (FIG. 1). Typically, some or all of the data structures and program modules are stored in system memory 108 and for ease of presenting the various features and advantages of the present systems, methods and articles, such data structures and program modules are drawn as components of system memory 108. However, it will be appreciated that at any given time, the program modules and data structures illustrated in system memory 108 may be stored in main non-volatile memory 114, or other memory (not shown). Furthermore, some or all of the data structures and program modules may be stored on a remote computer, or example the end user computing system 136 or some other computing system not illustrated in FIG. 1, provided that the remote computer is addressable by the digital computing subsystem 102, i.e., there is some communication means between the remote computer and digital computing subsystem 102 such that data can be exchanged between the two computers over a data network (e.g., the Internet, a serial connection, a parallel connection, Ethernet, etc.) using a communication protocol (e.g., FTP, telnet, SSH, IP, etc.).

The operating system 118 (FIG. 1) may be configured to handle various system services, such as file services, and for performing hardware dependent tasks. Many operating systems that can serve as operating system 118 are known in the art including, but not limited to UNIX, Windows NT, Windows XP, DOS, and LINUX. Alternatively, there may be no operating system present and instructions may be executed in a daisy chain manner.

With returning reference to FIG. 3, one or more end user applications 312a-312n (collectively 312) execute on one or more end user computing systems 136 (FIG. 1) to provide problems or queries (i.e. problem data) 314 to the computing system 100 via one or more communications channels, such as network 138.

A local configuration of the application layer 304a executes locally with respect to the computing system 100, and includes one or more end user interface applications 120a-120n (collectively 120). For example, the local configuration of the application layer 304a may execute on the digital computing subsystem 102. Alternatively, or additionally, a remote configuration of the application layer 304b executes remotely from the computing system 100, and includes one or more end user interface applications 120a-120n. For example, the remote configuration of the application layer 304b may execute on the end user computing system 136 (FIG. 1). Thus, the application layers 304 allow the end user interface applications 120 to reside locally or remotely. An end user may desire to use the remote configuration, for example where the end user desires additional security or develops their own applications.

The end user interface applications 120 are specific to a particular type of end user application 312 and/or problem. The end user interface applications 120 convert problem data 314 received from the end user applications 120 into an appropriate format suitable for the computing system 100, and sends the converted problem data 316 through the computing system API to the daemon layer 306. The end user interface applications 120 also convert problem answers 318 received from the server applications 122 into a form suitable for the end user applications 312, and provides the converted problem answers 320 to the end user applications 312 executing on the end user computing system 136 (FIG. 1). As discussed in detail below, the problem answers may include exact answers, best answers (for example where there is no exact answer such as where the problem is over-constrained), as well as an indication of how responsive (i.e., responsiveness) a returned answer is to a query.

The daemon layer 306 coordinates the problem solving process, dividing a problem into subproblems as necessary or desirable, and sending the subproblems to be processed by an analog processor 326. The daemon layer 306 also combines answers (i.e., subanswers) to subproblems into an answer (i.e., combined answer) to the problem.

Residing at the daemon layer 306 are the server applications 122, scheduler module 124, meta-optimizer module 126, threads 322 and database 302. The server applications 122 provide the converted problem data 316 to the scheduler module 124. The scheduler module 124 places the problem represented by the converted problem data 316 in a queue. When the daemon layer 306 is ready to process the particular problem, the scheduler module 124 guides the problem through the threads 322, which may include, e.g., a decomposition thread 400 (FIG. 4), solution thread 500 (FIG. 5) and post-processing thread 600 (FIG. 6).

Figure 4:
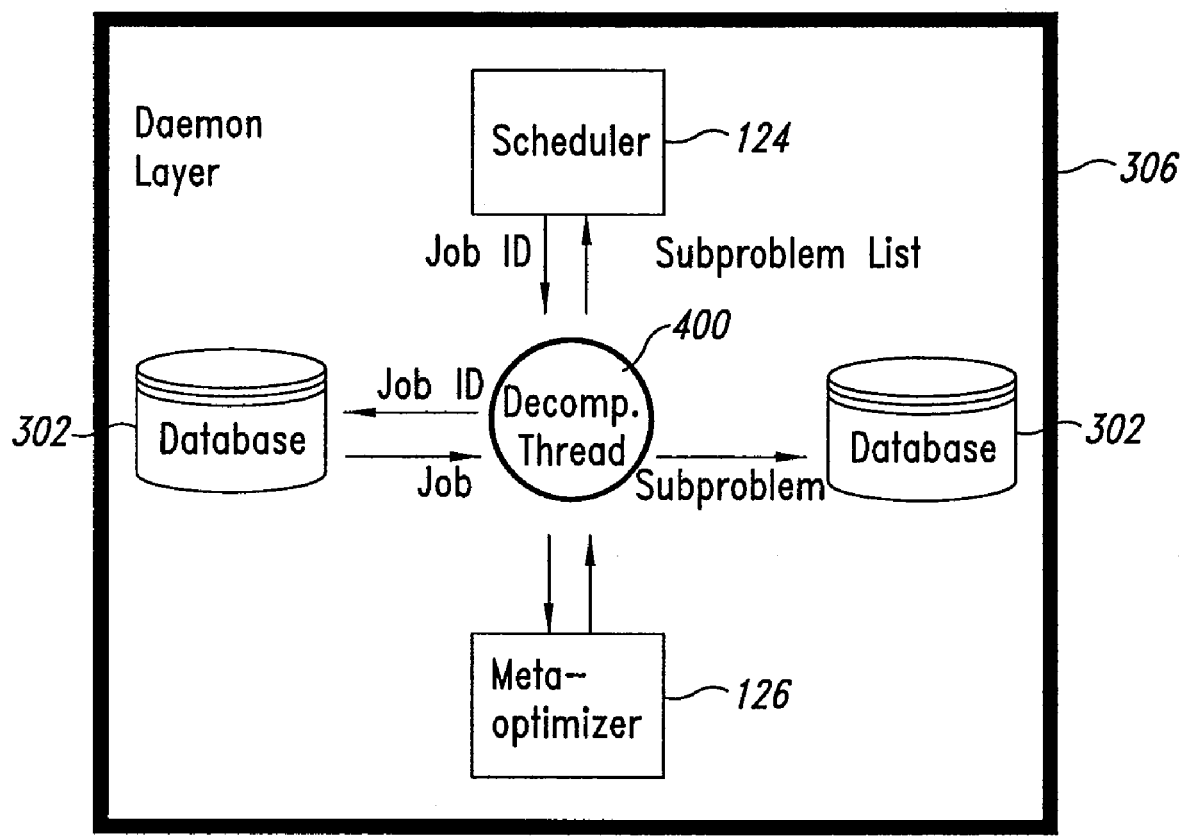
FIG. 4 is a schematic diagram showing an operation of a decomposition thread in a computing system, according to at least one illustrated embodiment of the present systems, methods and articles.

FIG. 4 shows operation of a decomposition thread 400, according to one illustrated embodiment.

The decomposition thread 400 and meta-optimizer module 126 split the converted problem data 316 into subproblems, each of suitable size to be processed by the analog processor 326.

Figure 5:
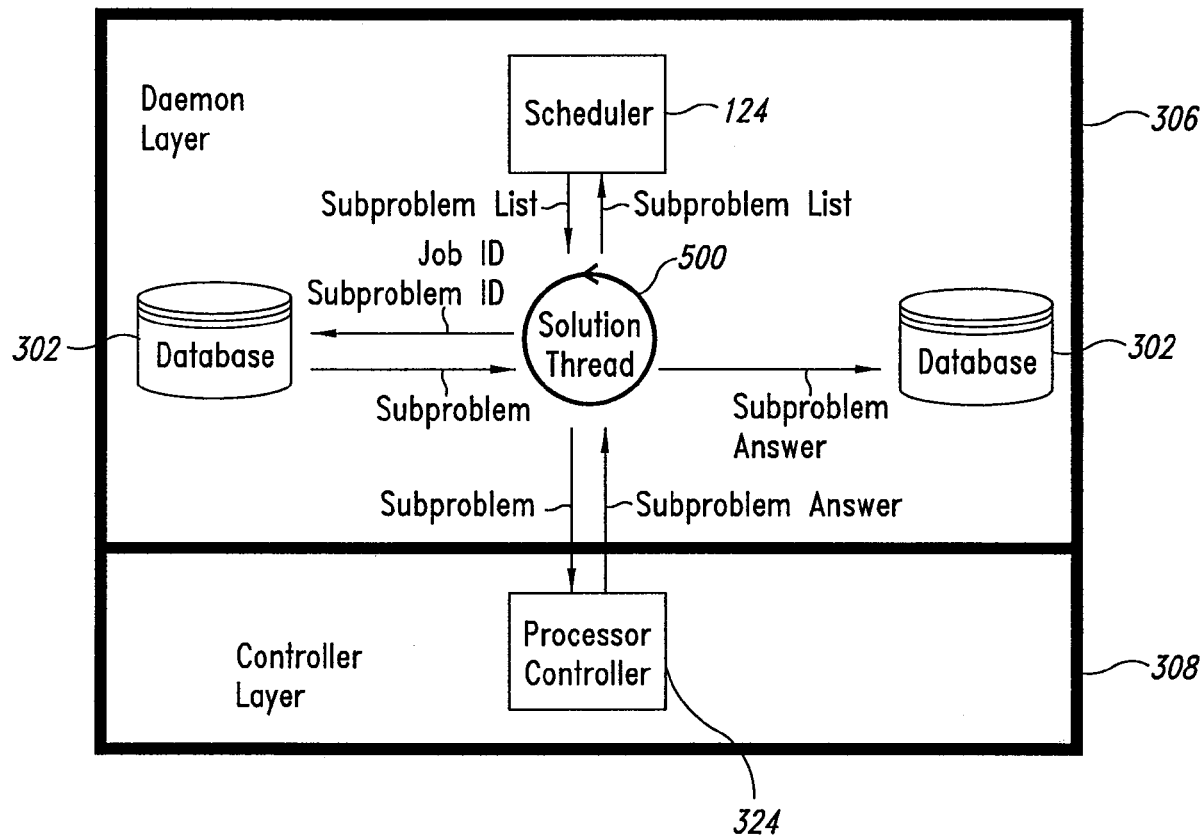
FIG. 5 is a schematic diagram showing an operation of a solution thread in a computing system, according to at least one illustrated embodiment of the present systems, methods and articles.
Figure 6:
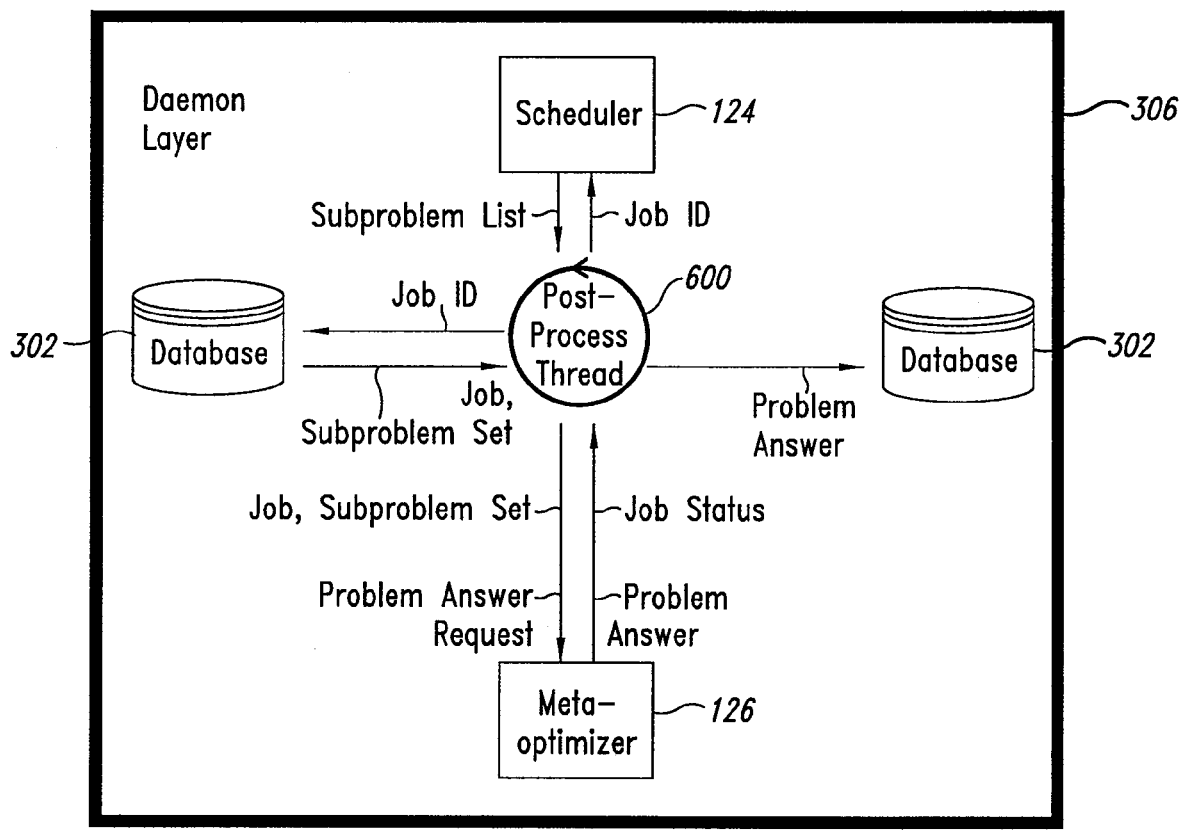
FIG. 6 is a schematic diagram showing an operation of a post-processing thread in a computing system, according to at least one illustrated embodiment of the present systems, methods and articles.

FIG. 5 shows the operation of a solution thread 500, according to one illustrated embodiment.

The solution thread 500 sends each subproblem through an API to the controller layer 308. For each subproblem, the solution thread 500 also determines if a respective subanswer that is returned is valid. If the subanswer is determined as not being valid (i.e. invalid), the solution thread 500 resubmits the subproblem to be processed again. If the answer is valid, the solution thread 500 sends the subanswer to the post-processing thread 600.

FIG. 6 shows the operation of a post-processing thread 600, according to one illustrated embodiment.

One embodiment of the post-processing thread 600 determines whether all subproblems have subanswers. If so, the post-processing thread 600 determines if a combined answer to the problem is the best answer so far. If the combined answer is determined as being the best answer so far, the post-processing thread 600 stores the combined problem answer in the database 302. If not, the post-processing thread 600 deletes the combined problem answer.

The post-processing thread 600 then determines if the problem has been adequately solved. If the problem has not been adequately solved (i.e., the combined problem answer is inadequate), the post-processing thread 600 sends the problem back to the job queue, managed by the scheduler module 124. If the problem has been adequately solved, the post-processing thread 600 determines if the best problem answer is valid for the problem type.

If the best answer is not valid for the problem type, a further embodiment of the post-processing thread 600 may delete the problem answer and send the problem back to the job queue managed by the scheduler module 124. If the best problem answer is valid, the scheduler module 124 and server application 122 return the problem answer to the application layer 304. The problem answer may be returned in 2-arity format, where the problem answer is converted into an end user application format, suitable for delivery to the end user as the best answer to the problem.

With continuing reference to FIG. 3, residing at the device layer 310 are one or more analog processors 326. The analog processor(s) 326 may, for example, take the form of one or more quantum processors 150 (FIG. 1). The analog processor 326 is operable to determine one or more possible solutions to a problem. For example, the analog processor 326 may be evolved from an initial state to a final state that represents one or more possible solutions to a problem. For instance, a quantum processor 150 may be evolved (e.g., a natural physical evolution such as adiabatic evolution, an annealing evolution or quasi-adiabatic evolution), from a higher energy state to a lower energy state representative of one or more possible solutions to a problem represented by a graph that has been embedded on the quantum processor 150.

The analog processor interface module 130 (FIG. 1) may include run-time instructions for performing such evolution. For example, the analog processor interface module 130 may include instructions used to coordinate the solution of computational problems using an analog processor 326, for example the quantum processor 150 (FIG. 1). For instance, analog processor interface module 130 may initiate the quantum processor 150 into the graph embedding derived using the instructions of the mapper module 128. This may include, e.g., setting initial coupling values and local bias values for coupling devices 154 (FIG. 1) and qubit nodes 152 respectively. Qubit nodes 152 and associated local bias values may represent vertices of the embedded graph, and coupling values for coupling devices 154 may represent edges in the embedded graph. For example, a vertex in a graph may be embedded into quantum processor 150 as a set of qubit nodes 152 coupled to each other ferromagnetically and coupling interactions may be embedded as a ferromagnetic or antiferromagnetic coupling between sets of coupled qubit nodes 152. For more information, see for example US 2005-0256007, US 2005-0250651 and U.S. Pat. No. 7,135,701 each titled "Adiabatic Quantum Computation with Superconducting Qubits". The analog processor interface module 130 may also include instructions for reading out the states of one or more qubit nodes 152 at the end of an evolution. This readout may represent a solution to the computational problem.

The controller layer 308 programs the analog processor 326 to solve a subproblem. For example, where analog processor 326 includes a quantum processor 150 (FIG. 1), the analog processor can be programmed by "tuning" the quantum processor 150. As previously discussed, "tuning" may include adjusting control line currents to set an initial state of some or all of the quantum nodes 152, and to adjust how strongly the quantum nodes 152 are coupled (i.e., their relations) via the coupling devices 154.

Residing at the controller layer 308 are one or more processor controllers 324. The one or more processor controllers 324 may, for example, take the form of one or more qubit control systems 158 (FIG. 1) and/or coupling device control systems 160 (FIG. 1). The processor controller 324 is operable to configure the analog processor 326 to solve a particular problem. For example, the processor controller 324 may be operable to map a problem into the analog processor 326. For instance, the processor controller 324 may be operable to map a graph representing a problem into the analog processor 326.

The mapper module 128 (FIG. 1) may include instructions to embed such a graph into the analog processor 326. Embedding techniques that may be used by mapper module 128 include the braided layout and/or the outward expansion graph embedding techniques described in U.S. provisional patent application Ser. No. 60/864,129 filed on Nov. 2, 2006 and entitled "GRAPH EMBEDDING TECHNIQUES". Mapper module 128 may be configured to employ more than one technique and to select the most efficient embedding for actual embedding into the analog processor 326. Mapper module 128 may also be configured to convert a computational problem or query, such as Maximum Independent Set, Max Clique, Max Cut, TSP problem, k-SAT, integer linear programming, or Ising model in a magnetic field, into a graph before commencing the embedding process. Mapper module 128 may also include a graphical user interface capable of displaying the graph and any intermediate acts or final results of the embedding of the graph. Intermediate steps may be displayed, such as the assignment of vertices and edges, the pre-optimized embedding, and optimization steps done on the embedding. Final results may include one or more optimized embeddings constructed by mapper module 128.

System Operation

FIG. 7 shows a method 700 of operating a computing system 100 to solve problems, according to one illustrated embodiment.

The method 700 starts at 702. For example, the method 700 may start on powering up or booting up the computing system 100 of FIG. 1.

At 704, the end user application interface 120 (FIG. 3) and/or computing system 100 receives problems from end user applications 312 executing on one or more end user computing systems 136 (FIG. 1). As discussed previously, the end user applications 312 convert the problems to an appropriate format, and the server application 122 forwards the problems to the scheduler module 124.

At 706, the scheduler module 124 (FIG. 3) places the received problem in a queue to be processed by at least one target analog processor 326.

At 708, the problem is parsed (decomposed) in the daemon layer 306 (FIG. 3), into subproblems of suitable size to be processed by at least one target analog processor 326 (FIG. 3).

At 710, for each of the subproblems, the processor controller 324 sets the parameters of the at least one target analog processor 326 to embed the subproblem into the at least one target analog processor 326.

At 712, a subanswer to the subproblem is determined from a final state of the at least one target analog processor 326.

FIG. 8 shows a method 800 of operating a processor controller 324 to embed a graph representing a problem or query into an analog processor 326, according to one illustrated embodiment.

At 802, the processor controller 324 sets parameters of the analog processor 326. For example, the NIC 140, qubit control system 158 and/or coupling device control system 160 (FIG. 1) may set various parameters of the qubits 152 and/or the coupling devices 154.

FIG. 9 shows a method 900 of operating elements of a daemon layer 306 to decompose a problem into subproblems, according to one illustrated embodiment.

At 902, the meta-optimizer module 126 optimizes the subproblems for processing on the at least one target analog processor 326. The meta-optimizer module 126 operates in conjunction with the decomposition thread 400 (FIG. 4).

Figure 10:
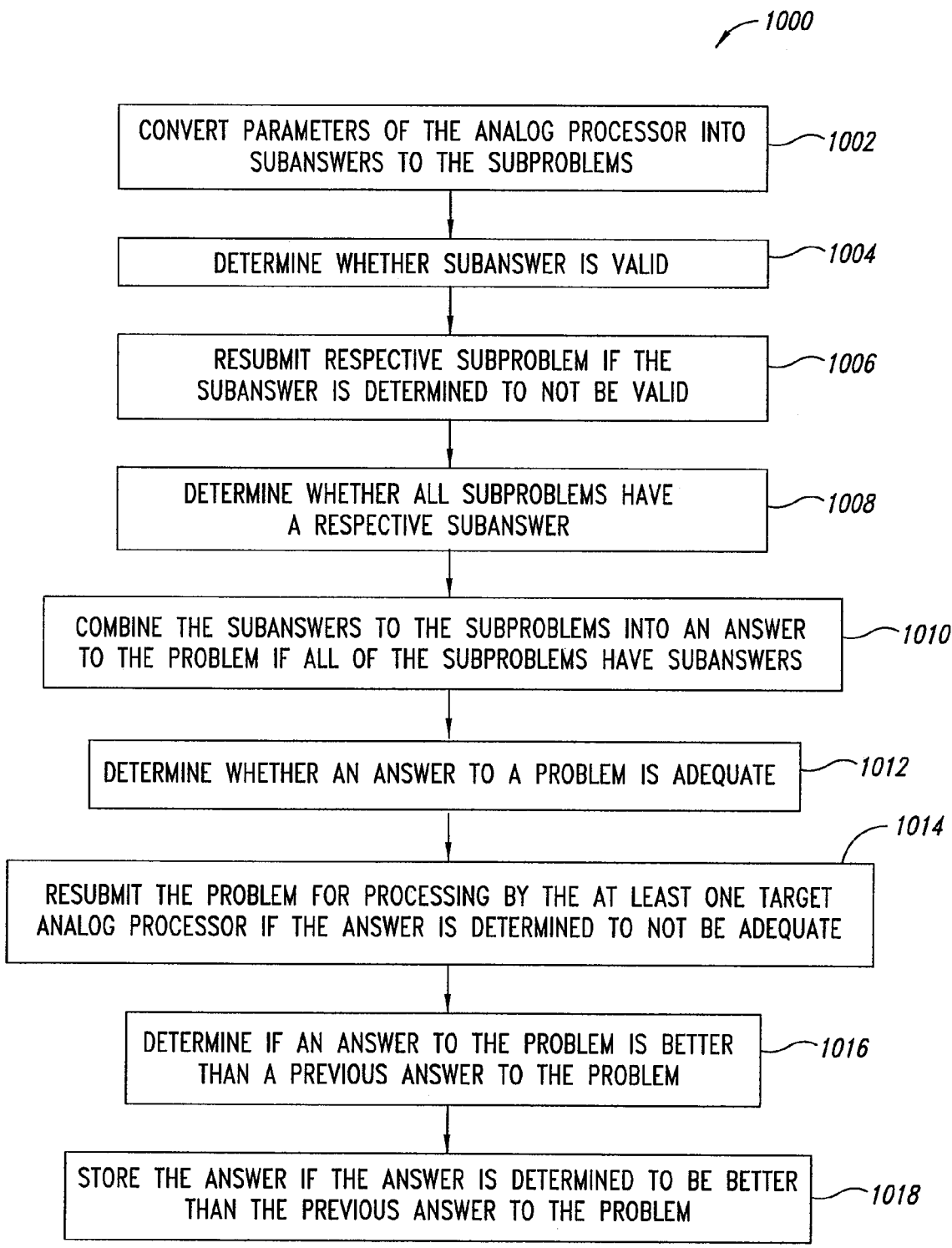
FIG. 10 is a flow diagram showing a method of operating elements of a daemon layer to validate subanswers to subproblems and answers to problems, according to at least one illustrated embodiment of the present systems, methods and articles.

FIG. 10 shows a method 1000 of operating elements of a daemon layer 306, to validate subanswers to subproblems and answers to problems, according to one illustrated embodiment. Validation may take the form of confirming whether the derived subanswer or answer matches an expected subanswer or answer in form or number. For example, whether all nodes are independent or alternatively whether all nodes are interconnected, depending on the type of subproblem or problem being solved.

At 1002, the processor controller 324 converts parameters of the analog processor 326 into subanswers to the subproblems.

At 1004, the solution thread 500 (FIG. 5) determines whether subanswer is valid. At 1006, the solution thread 500 resubmits a respective subproblem for processing if the subanswer is determined to be invalid. The solution thread 500 may include a limit on the number of times the same subproblem will be resubmitted before producing a suitable message (e.g., an error message).

At 1008, the solution thread 500 determines whether all subproblems have a respective subanswer. At 1010, the solution thread 500 combines the subanswers to the subproblems into an answer to the problem if all of the subproblems have subanswers. If not, the solution thread 500 may resubmit the problem for further processing, or may resubmit a subproblem for processing. The solution thread 500 may include a limit on the number of times the same problem or subproblem will be resubmitted before producing a suitable message (e.g., an error message).

In one embodiment, at 1012, the solution thread 500 determines whether an answer to a problem is adequate. At 1014, the solution thread 500 resubmits the problem for processing by the at least one target analog processor 326 if the answer is determined to be inadequate. The solution thread 500 may include a limit on the number of times the same problem will be resubmitted before producing a suitable message (e.g., an error message).

At 1016, the solution thread 500 determines if an answer to the problem is better than a previous answer to the problem. At 1018, the solution thread 500 stores the answer if the answer is determined to be better than the previous answer to the problem.

FIG. 11 shows a method 1100 of operating the end user application interface 120 to convert between an end user application format and a format suitable for the computing system 100, according to one illustrated embodiment.

At 1102, the end user application interface 120 converts a problem from an end user application format into a generalized format suitable for use with the computing system 100. For example, the end user application interface 120 may convert from one query language to another, such as from SQL to DATALOG.

FIG. 12 shows a method 1200 of operating a computing system 100 to solve queries, according to another illustrated embodiment.

The method 1200 starts at 1202. For example, the method 1200 may start on powering or booting up of the computing system 100 (FIGS. 1 and 3), or on receipt of a problem or query.

At 1204, the computing system 100 determines a query graph representative of a query.

In some embodiments, at 1206, the computing system 100 determines a database graph from information stored in a database 302 (FIG. 3). In some cases, the information of the database 302 does not represent three-dimensional geometry. For example, the information in the database 302 may be related to personnel or human resources, to customers or clients, or tracking inventory or shipments. Also for example, the information in the database 302 may be related two-dimensional geometry such as a map of a geographic region or a network architecture.

At 1208, the computing system 100 determines an association graph based on the query and database graphs.

At 1210, the computing system 100 evolves an analog processor 326 (FIG. 3) such as a quantum processor 150 (FIG. 1) from an initial to a final state. The final state may be representative of a clique of the association graph, such as an arbitrary clique, a maximal clique or a maximum clique of the association graph.

At 1212, the computing system 100 provides responses to the query based on the determined clique of the association graph.

At 1214, the computing system provides an indication of a level of a responsiveness of each response to the query. Responsiveness may, for example, be determined by scoring answers based on the number of mutually consistent facts in the returned answer that match the query. Thus, an answer that satisfies 14 of 17 constraints may be scored 14/17, while an answer that satisfies 13 of 17 constrains would be ranked lower with a score of 13/17. The computing system 100 may employ other criteria and/or methods to scoring or rank answers.

Figure 13:
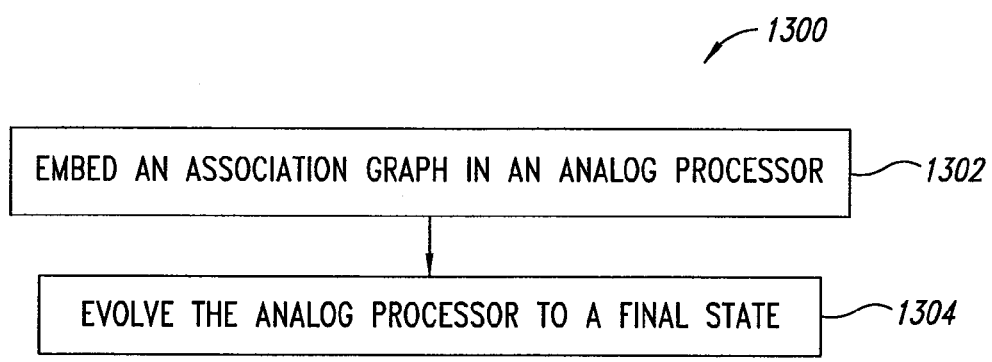
FIG. 13 is a flow diagram showing a method of operating a computing system to solve queries by determining a clique, according to at least one illustrated embodiment of the present systems, methods and articles.

FIG. 13 shows a method 1300 of operating a computing system 100 to determine a clique, according to one illustrated embodiment.

At 1302, the computing system 100 embeds an association graph in an analog processor 326, for example a quantum processor 150. At 1304, the processor processes the problem, for example the quantum processor 150 is evolved from an initial to a final state. As discussed above, the final state may be representative a clique of the association graph, such as an arbitrary clique, a maximal clique or a maximum clique of the association graph.

Figure 14:
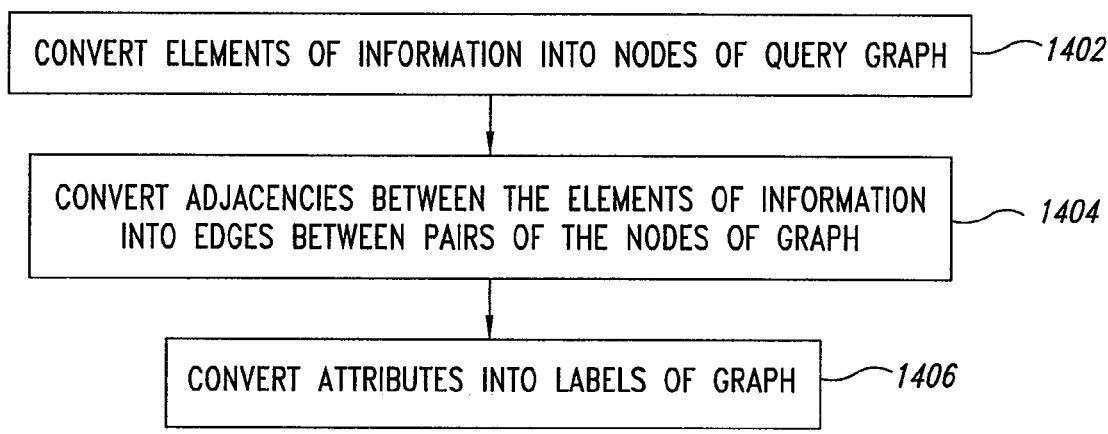
FIG. 14 is a flow diagram showing a method of operating a computing system 100 to form a graph, according to at least one illustrated embodiment of the present systems, methods and articles.

FIG. 14 shows a method 1400 of operating a computing system 100 to form an association graph, according to one illustrated embodiment.

At 1402, the computing system 100 converts elements of information into nodes of a query graph. At 1404, the computing system 100 converts relations between the elements of information into edges between pairs of the nodes of the association graph.

At 1406, the computing system converts attributes into labels of the association graph.

Figure 15:
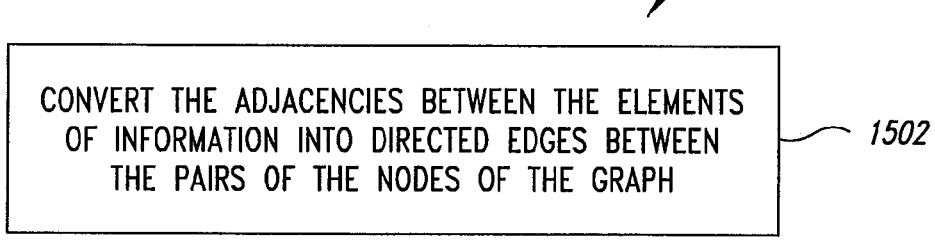
FIG. 15 is a flow diagram showing a method of operating a computing system to convert elements of information into a directed graph, according to at least one illustrated embodiment of the present systems, methods and articles.

FIG. 15 shows a method 1500 of operating a computing system to convert elements of information into a directed graph, according to one illustrated embodiment.

At 1502, the computing system converts the relations between the elements of information into directed edges between the pairs of the nodes of the graph.

Figure 16:
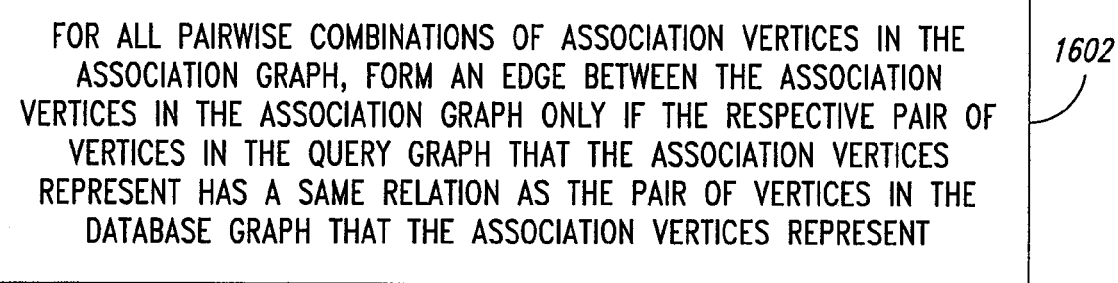
FIG. 16 is a flow diagram showing a method of operating a computing system to form an association graph, according to at least one illustrated embodiment of the present systems, methods and articles.

FIG. 16 shows a method 1600 of operating a computing system 100 to form an association graph, according to one illustrated embodiment.

At 1602, for all pair-wise combinations of association vertices in the association graph, an edge is formed between the association vertices in the association graph only if the respective pair of vertices in the query graph that the association vertices represent a same relation as the pair of vertices in the database graph that the association vertices represent.

FIG. 17 shows a method 1700 of operating a computing system 100 to provide results of a query in a ranked order, thereby providing an indication of a level of responsiveness of the answer to the query, according to one illustrated embodiment. As discussed above, responsiveness may, for example, be determined by scoring answers based on the number of mutually consistent facts in the returned answer that match the query. Thus, an answer that satisfies 14 of 17 constraints may be scored 14/17, while an answer that satisfies 13 of 17 constrains would be ranked lower with a score of 13/17. Thus, a ranking may be established based on a number of relaxations made to the query in order to achieve the respective answer, the more relaxations the lower the rank. The computing system 100 may employ other criteria and/or methods to scoring or rank answers.

At 1702, the computing system 100 provides responses to the query. The computing system 100 may, for example, provide the responses in a ranked order based on the determined clique of the association graph. The rank may be indicative of a level of responsiveness that the response has to the specific query. Thus, the more relaxing of constraints that are required to achieve a particular response, the lower the ranking.

FIG. 18 shows a method 1800 of operating a computing system 100 to form an association graph with 2-arity or less-arity relations, according to one illustrated embodiment.

At 1802, it is determined whether the database contains any n-arity relations. If so, control passes to 1804, if not control passes to 1810.

If the database contains n-arity relations, a set of attributes which uniquely identify a tuple are aggregated into a single compound attribute, at 1804. A respective table is generated in the database for each of the attributes that is not a key such that table represents a 2-arity or less-arity relation. At 1808, it is determined whether database contains any more n-arity relations. If so, control returns to 1804. If not, control passes to 1810.

At 1810, the computing system 100 identifies each element in a set of elements for each of the tables representing the 2-arity or less-arity relations with a respective vertex in the pseudograph. At 1812, the computing system 100 adds a loop to the respective vertex for each 1-arity relation. At 1814, the computing system 100 adds an edge between a respective pair of vertices for each 2-arity relation.

FIG. 19 shows a method 1900 of operating a computing system 100 to generate a 2-arity table, according to one illustrated embodiment.

At 1902, the computing system 100 generates a 2-arity table consisting of a compound attribute and an attribute that is not part of the compound attribute.

FIG. 20 shows a method 2000 of operating a computing system 100 to form an association graph with 2-arity or less-arity relations, according to another illustrated embodiment.

At 2002, for each of a number of tables with a key and multiple attributes, the computing system 100 splits the table into a set of tables each consisting of a key and a single attribute. At 2004, the computing system 100 identifies each element in a set of elements for each of the tables representing a 2-arity or less-arity relations with a respective vertex in the pseudograph. At 2006, a loop is added to the respective vertex for each 1-arity relation. At 2008, an edge between a respective pair of vertices is added for each 2-arity relation.

Graph Creation and Manipulation

There are two primary tasks in implementing relaxed constraint structured query language (referred to herein as "RCSQL") according to embodiments of the present systems, methods and articles. Firstly, all possible groundings for all variables in the query are explored and for each of these groundings the largest set of consistent constraints is determined (or, in other words, the smallest set of constraints to relax is determined). Both of these problems may be solved using association graphs. This solution approach requires constructing and manipulating a graphical representation of a database and queries to that database.

Both databases and queries may be represented as labeled pseudographs. A labeled pseudograph is a set vertices V and a set of edges $E \subseteq V \times V$ consisting of pairs of vertices. A pseudograph is distinguished from a graph in that there may be multiple loops and edges. A loop is an edge starting and ending at the same vertex, $(\upsilon, \upsilon) \in E$ where $\upsilon \in V$. Additionally, both loops and edges may occur multiple times in E. In other words, an edge $(\upsilon, \upsilon')$ may occur more than once in E. The pseudograph is labeled so that each edge (including loops) has an associated label.

Formally, a function $\mu: E \mapsto \{L\}$ maps each edge $e \in E$ to a list of labels with each label drawn from a set of possible labels L, in other words, $\mu(\upsilon, \upsilon')$ gives the label(s) for edge $(\upsilon, \upsilon')$. Note that because multiple edges are allowed for, the list $\mu(\upsilon, \upsilon')$ may contain more than one label (indicated in the mapping u by writing the domain of $\mu$ to be $\{L\}$ to indicate that an edge is mapped to a set of labels).

TABLE 1

(a) Conversion of an 3-arity relation to a 2-arity relation by (b) aggregating three attributes, and by (c) generating multiple tables for each attribute other than the keys. Note here that in this case the first two attributes are required to identify a key.

| (a) | | | (b) | | (c) | | |
|---|---|---|---|---|---|---|---|
| a | α | 1 | red | a, α, red | 1 | a, α | 1 | a, α red |
| a | β | 2 | yellow | a, β, yellow | 2 | a, β | 2 | a, β yellow |
| b | α | 1 | blue | b, α, blue | 1 | b, α | 1 | b, α blue |
| c | γ, | 3 | red | c, γ, red | 3 | c, γ | 3 | c, γ red |

A labeled pseudograph may be constructed from a database as follows. If all relations in the database are at most 2-arity (meaning they have only one or two attributes), and the elements for all tables come from a set U then the set U is identified with the vertex set V of the graph. This means there is a node in the graph for each element occurring in a tuple and column of every table in the database.

The 1-arity relations (the relations consisting of a single attribute) can be represented by a loop connecting an element $u \in V$ to itself and labeled with the name of the 1-arity relation. Similarly, a 2-arity relation involving a pair of elements u, u' is indicated as an edge (u, u') labeled by the name of the relation.

Since any given element u or pair of elements u, u' may appear in multiple tables there may be multiple loops of edges in the pseudograph (though these edges will all have different labels).

Note that vertices are not reused in this example. For instance, a table element may appear in multiple positions in one or more tables. In principle, a single graph node could be used to represent this element and the element would have multiple edges or loops emanating from the node. This reuse would save space in any representation of the graph. However, in some embodiments, vertices are not reused because by not reusing the vertices later processing of the pseudograph is less complex. Those of skill in the relevant art will appreciate that it is not necessary to explicitly construct the database pseudograph in any event. Thus, the pseudograph consists of a number of disconnected graphs with each connected component representing a tuple occurring in a relation.

Most databases do not have only 1-arity and 2-arity relations. Commonly, relations have more than two attributes, and often have keys which are compound (the table requires the specification of more than a single attribute to uniquely specify a tuple).

A relation with more than 2 attributes can be converted to a 2-arity relation in either of two ways. If a table has a attributes, any set of a−1 attributes which uniquely identify a tuple may be aggregated into a single compound attribute. Then, the 2-arity table consisting of two attributes is formed: firstly the single compound attribute and secondly the remaining attribute which was not included in the definition of the compound attribute. Table 1(b) provides a simple example of this process whereby the 4-arity table from Table 1(a) has been converted by aggregating attributes as in Table 1(b).

Alternatively, a single table with a key and multiple attributes can be split into a set of tables each consisting of a key and single attribute. Table 1(c) shows the result of this procedure on the 4-arity table example of Table 1(a). Both types of conversion may be exploited in converting a database to a labeled pseudograph.

Another way to view the conversion of non-2-arity relations to 2-arity relations is the following. A table with more than two attributes is a hyperedge in the hypergraph representing the database. To convert the hypergraph to a graph a new node is introduced for each hyperedge. This new node is then connected to all the other nodes in the hyperedge. In this way the node corresponding to the key is a unique node which identifies the hyperedge.

A tuple of a relation with arity A (with A>2) is converted into a graph of A+1 nodes. Nodes 1 through A represent the information stored in each of the A attributes. Node A+1 represents the key for the tuple (since the key uniquely identifies the tuple). The key node is connected to each of the attribute nodes. The edge between the key and the ith attribute is labeled $R.a_i$ where R is the relation name and $a_i$ is the ith attribute name.

One embodiment of an method to convert a database (set of relations) to a labeled pseudograph is as follows in Method 1.

---

Method 1 Conversion of a database into a labeled pseudograph

---

Require: a set of relations $\mathcal{R} = \{R_1, R_2, \ldots, R\mathcal{R}\}$
Ensure: $G = (V, E, \mu)$ is a labeled pseudograph describing the database
1: procedure GRAPHIFY(R)

-continued

Method 1 Conversion of a database into a labeled pseudograph

```
2:      V ← [ ]; E ← [ ]; μ ← [ ]                         ▷initialize graph
3:      for R_i ∈ ℛ do                                    ▷loop over all relations
4:          tableName = RELNAME(R_i)
5:          keyAttr = GETKEY(R_i)
6:          for t ∈ TUPLES(R_i) do
7:              n ← t[keyAttr]
8:              V ← ADDNODE(n, V)
9:              if ISCOMPOUND(keyAttr) ∨ ARITY(R_i) > 2 then    ▷add compound key as a node
10:                 for i ∈ 1, |keyAttr| do
11:                     a ← n[i]
12:                     V ← ADDNODE(a, V)
13:                     E ← ADDEDGE(<n, a>, E)
14:                     μ(⟨n, a⟩) = tableName.keyAttr[i]
15:                 end for
16:             end if
17:             nonKeyAttr ← keyAttr
18:             if ISEMPTY(nonKeyAttr) then                ▷no non-key attributes so add a loop
19:                 E ← ADDEDGE(⟨n, n⟩)
20:                 μ(<n, n>) = tableName
21:             else
22:                 for i ∈ 1, |nonKeyAttrs| do            ▷add edge between key and non-key attributes
23:                     m ← t[nonKeyAttr[i]]
24:                     V ← ADDNODE(m, V)
25:                     E ← ADDEDGE(<n,m>,E)
26:                     μ(<n,m>) = tableName.nonKeyAttr[i]
27:                 end for
28:             end if
29:         end for
30:     end for
31: end procedure
```

The method processes all relations, and for each relation adds the appropriate nodes to the vertex list and the appropriately names edges to the edge list and name mappings. The table name is obtained and used as the basis for naming edges. The keyAttr list records the attributes which are keys for the table. At line 6 begins a loop over all the rows in the table. t labels any particular tuple. For this tuple, the values corresponding to the keys are extracted and added to the node list.

The ADDNODE function adds the node to list of vertices V. If the node is already present in V it is added again. If the key to the table is compound (there is more than 1 attribute in the key), then nodes are also added for the values of all key attributes in t. An edge is added from each of these attribute nodes to the node representing the compound key for the tuple. Each node is labeled by tableName.keyAttr[i] where keyAttr[i] is the attribute name for ith attribute node.

Next, edges are added between the key node and the values in the non-key attributes. If there are no non-key attributes (line 18) then a loop is added on the key node. The loop is labeled by the table's name. If there are non-key columns in the table, an edge is added from the compound node to each of these non-key nodes. Each edge is labeled by tableName.non-KeyAttr[i] where nonKeyAttr[i] is the attribute name for the ith non key attribute node.

Though this method makes explicit how the graph is formed, as is discussed herein, it is not always necessary to construct the database graph.

An analogous procedure may be used to represent queries. Any conjunctive query may be represented by the conjunction of a number of single relation queries, for example:

movie(MovieTitle, ReleaseDateYear, releaseDateMonth, '20th Century Fox'), starsIn(A, MovieTitle, ReleaseDateYear).

This query involves two tables and returns the actors (A) who have starred in a movie (MovieTitle) released by 20th Century Fox in a given year (ReleaseDateYear) and month (ReleaseDateMonth). This query may be processed exactly as in Method 1 where now each table includes only a single tuple (unless the same table is referred to multiple times in the query), and the tuple may involve variables. The only difference is that nodes associated with variables are annotated to include this information. This procedure may be extended to allow for negation of predicates as discussed below. For queries with multiple bodies—disjunctive queries (i.e., representing OR operations)—the query for each body is formed in the same manner as described above in reference to conjunctive queries.

In some embodiments, it may be desirable to minimize the sizes of the graphs produced by converting databases and queries to graphs. In particular, the complexity of an RCSQL query may be a function of the number of nodes in both the database and query pseudographs, in which case it may be desirable to extract only the portion (or portions) of the database that is relevant to answering the query.

For example, tables which indicate the gender of an actor, their salary, and other factors may be irrelevant to answering the query or relaxations of a certain query. Further, the query may be only interested in movies produced by 20th Century Fox, so there is no need to consider movies produced by other studios. In some embodiments, only the relevant portion of the database may be pruned so that no possible relaxations are lost, and yet the number of nodes in the resulting pseudograph is minimized.

The database may be pruned in the two ways alluded to above: firstly only tables associated with the query are included, and secondly all such tables are projected down to eliminate tuples which do not match grounded (i.e., bound versus free or unbound) variables. This sets the domain for all variables. An exemplary method to accomplish this pruning is:

---

Method 2 Pruning of a database $\mathcal{R}$ into a smaller database that is relevant to a query q = $\{Q_1, Q_2, \ldots Q_{|q|}\}$

---

Require: a set of relations $\mathcal{R} = \{R_1, R_2, \ldots, R_{|\mathcal{R}|}\}$ and
a query q = $\{Q_1, Q_2, \ldots Q_{|q|}\}$
Ensure: the minimal database $\mathcal{R} = \{R'_1, R'_2, \ldots, R'_{|q|}\}$ relevant to the query q
1:    procedure PRUNEIRRELEVANT($\mathcal{R}$, q)
2:      for i ∈ 1, |q| do
3:         [attrs, vals] ← GROUNDS($Q_i$)
4:         $R'_i$ ← GETTABLE($Q_i$)
5:         $R'_i$ ← SELECTANDPROJECT($R'_i$, $Q_i$, attrs, vals)
6:      end for
7:    end procedure

---

Thus, for each table ($Q_i$) entering into the query the set of attributes (attrs) which are grounded are determined, and as is the value (vals) to which each attribute is constrained. In line 4 of Method 2, the table referenced by $Q_i$ is retrieved from the database. Next, in SELECTANDPROJECT a tuple is eliminated from the table by selecting down to include only the tuples which have the assigned values for the attributes and which are then projected out to include only those columns of $Q_i$ involving variables.

More formally, if $\sigma_{j=a}$ is the standard selection operator of relational algebra, and $\pi_j$ is the standard projection operator then SELECTANDPROJECT is $\pi_{vars}\sigma_{attrs=vals}$ where vars is a list of the attributes in which the query contains a variable. To define these operators let t be a tuple from a database table and let t(j) or t(a) indicate the component of the table in column j or attribute a. The selection operator acting on a table R is $\sigma_{j=a}R \equiv \{t \in R | t(j)=a\}$. If j and a are vectors we take the intersection of all elements of the vectors, i.e., $\sigma_{j=a}R$ is shorthand for $\sigma_{j(end)=a(end)} \cdots \sigma_{j(1)=a(1)}R$. The projection operator $\pi_j R$ is defined by $\pi_j R \equiv \{(t(j(1)), \ldots, t(j(end))) | t \in R\}$.

The original query may have involved the same table used in multiple ways, for example, edge(1,V1), edge(V1,V2), edge(V2,4) which seeks a path of length 2 starting at node 1 and ending at node 4. This query involves different projections of the same table, and these different projections must be labeled distinctly.

For example, for the database with a single edge table consisting of tuples ⟨1, 2⟩, ⟨1, 3⟩, ⟨2, 3⟩, ⟨3, 4⟩ the pruned tables are edge'$_1$, edge, and edge'$_2$ where edge'$_1$ consists of tuples ⟨2⟩, ⟨3⟩ (coming from selecting for tuple where attribute 1=1), and edge'$_2$ consists of the single tuple ⟨3⟩ (coming from selecting for attribute 2=4).

The graph representing the query may be pruned in a similar manner. Query subgoals $Q_i$ may be modified to $Q'_i$ by projection to only those attributes containing variables. In this way the arity of the query subgoals will match the arity of the involved relations.

In some embodiments, pruning may be combined with pseudograph generation. For example, the graph may first pruned, for example, given the query q as in Method 2, resulting in set of database tables $\mathcal{R}' = \{R'_1, \ldots, R'_{|q|}\}$ that involve only variables (since all grounded variables have been eliminated by projecting the tables down).

To run the graph generation over $\mathcal{R}$ keys must be treated properly. If the entire key is grounded this selects a single tuple from the table. Variables in queries and elements in databases appearing in keys are still grouped together to form a separate key node.

From the pruned database the allowed domain for each variable may easily be inferred. Let $fr(Q_i)$ give the set of free variables in predicate $Q_i$ appearing in the query, and let $c_i^{gr}$ label the columns of table $Q_i$ which are grounded. The grounded values in $Q_i$ are indicated by $a_i$. Both these quantities are written as vectors of the same length since more than one attribute may be grounded. Note that $c_i^{gr}$ and $a_i$ may be empty if there are no grounded attributes. $c_i^X$ is defined to be the set of (possibly empty) columns of $Q_i$ in which variable X appears. Again, $c_i^X$ may have more than one element if X is reused in multiple columns.

The table to match the grounded requirements is selected and $\sigma_{c_i^{gr}=a_i}R_i$ is obtained. A hard constraint that X is consistent across the columns $c_i^X$ may be imposed. Such causes selection of $$\sigma_{c_i^X(end-1)=c_i^X(end)} \cdots \sigma_{c_i^X(1)=c_i^X(2)} \sigma_{c_i^{gr}=a_i} R_i$$

where $c_i^X(j)$ selects the jth component of $c_i^X$, and $c_i^X$(end) selects the last component.

To obtain the possible X values, projection is then performed down to any component in $c_i^X$ (since the Xs will all be the same in all columns of any given tuple). Thus, the following set is defined:

$$S_i(X) = \pi_{c_i^X(1)} \sigma_{c_i^X(end-1)=c_i^X(end)} \cdots \sigma_{c_i^X(1)=c_i^X(2)} \sigma_{c_i^{gr}=a_i} R_i$$

$S_i(X)$ gives the set of allowed values of X for which predicate $Q_i$ may evaluate to true.

Since any query may be relaxed, the set of possible values of X for which at least one predicate may evaluate to true is $$dom(X) = \bigcup_{i | X \in fr(R_i)} S_i$$

When building the association graph, these domains can be used to restrict allowed pairings when representing the subgraph isomorphism.

To determine the best possible constraint relaxations, the pseudographs representing (the relevant portion of) the database and the query may be combined into a single undirected graph, that is, the "association graph". Let G$\mathcal{R}' = (V\mathcal{R}'E \mathcal{R}'\mu \mathcal{R}')$, represent the pseudograph for the database and let $G_q = (V_q, E_q, \mu_q)$ represent the query pseudograph.

The association graph $G_a = (V_a, E_a)$ may be constructed from a database pseudograph G$\mathcal{R}'$ and a query pseudograph $G_q$ as follows:

Vertices of the association graph (a-vertices) are possible pairs of vertices from V$\mathcal{R}'$ and $V_q$ having the same label, i.e., $V_a = \{(\upsilon \mathcal{R}', \upsilon_q) | \upsilon \mathcal{R}' \in_V \mathcal{R}' \in \upsilon_q \in V_q, \mu \mathcal{R}'(\upsilon \mathcal{R}', \upsilon \mathcal{R}') = \mu_q (\upsilon_q, \upsilon_q)\}$. As described above, the edge/loop label mappings return sets of labels. Equality between label sets $\mu \mathcal{R}'(\upsilon \mathcal{R}', \upsilon \mathcal{R}') = \mu_q(\upsilon_q)$ means that the sets are identical, that is, they have the same number of elements and the same elements, i.e., $\forall l [l \in \mu \mathcal{R}'(\upsilon \mathcal{R}', \upsilon \mathcal{R}') \mathcal{R}' \Leftrightarrow l \in \mu_q(\upsilon_q, \upsilon_q)]$ Edges of the association graph (a-edges) may be defined to be present/absent as follows. If $(\upsilon \mathcal{R}', \upsilon_q) \in V$, i.e., $\upsilon \mathcal{R}'$ and $\upsilon_q$ have compatible label sets, and $(\upsilon \mathcal{R}', \upsilon'_q) \in V_a$, then these two a-vertices may be connected according to the following prescription:

$$\left(\left(v_{\mathcal{R}}, v_q\right), \left(v'_{\mathcal{R}}, v'_q\right)\right) =$$

$$\begin{cases} present \; if & [(v_{\mathcal{R}}, v'_R) \in E_R \wedge (v_q, v'_q) \in Eq \wedge \mu_{\mathcal{R}}(v_{\mathcal{R}}, v'_{\mathcal{R}}) = \mu_q(v_q, v'_q)] \vee \\ & [(v_{\mathcal{R}}, v'_R) \notin E_{\mathcal{R}} \wedge (v_q, v_q) \in Eq \wedge \mu_{\mathcal{R}}(v_{\mathcal{R}}, v'_{\mathcal{R}}) = \mu_q(v_q, v'_q)] \\ absent & otherwise \end{cases}$$

The a-edge rule adopted ensures that the relation (or lack of relation) that holds between $v \mathcal{R}'_{and} v \mathcal{R}'$ also holds (or does not hold) between $v_q$ and $v_q'$.

Given that it is known how the pseudographs $G \mathcal{R}'$ and $G_q$ are formed, the association graph may be constructed, for example through an method such as:

will be new (for example those nodes connected to the key). ADDEDGES appends only the new edges to the a-edge set $E_a$.

Cliques and the Association Graph

The association graph is constructed in order to allow identification of labeled pseudographs common to both $G \mathcal{R}'$

---

Method 3 Construction of the association graph from the pruned query and database.

Require: a set of pruned relations $\mathcal{R} = \{R'_1, R'_2, \ldots, R'\mathcal{R}\}$ and a pruned query $q' = \{Q'_1, Q'_2, \ldots, Q'_{|q|}\}$
Ensure: the association graph $G_a = (V_a, E_a)$ formed from the query and database
 1:  procedure FORMASSOCIATIONGRAPH( $\mathcal{R}$, q')
 2:    $V_a \leftarrow [\,]; E_a \leftarrow [\,]$                      ▷initialize association graph
 3:    for $Q'_i \in q'$ do                          ▷generate and store graphs for each query subgoal
 4:      $[V_q^i, E_q^i, \mu_q^i] \leftarrow$ TUPLEGRAPH($Q'_i$)
 5:    end for
 6:    for $R'_i \in \mathcal{R}$ do
 7:      tableName $\leftarrow$ RELNAME($R'_i$)
 8:      attrNames $\leftarrow$ ATTRIBUTENAMES($R'_i$)
 9:      for $t \in$ TUPLES($R'_i$) do
10:        $V_t \leftarrow$ TUPLENODES(t)
11:        $E_t \leftarrow$ TUPLEEDGES(t)
12:        for $i \in 1, |q|$ do
13:          $\tilde{V}_a \leftarrow$ ASSOCIATIONNODES($V_a, V_t, V_q^i, \mu_q^i$, tableName)
14:          $\tilde{E}_a \leftarrow$ ASSOCEDGES($\tilde{V}_a, E_t, E_q^i, \mu_q^i$, tableName, attrNames)
15:          $V_a \leftarrow$ ADDNODES($V_a, \tilde{V}_a$)
16:          $E_a \leftarrow$ ADDEDGES($E_a, \tilde{E}_a$)
17:        end for
18:      end for
19:    end for
20:  end procedure

---

In Method 3, the pseudograph for the pruned query is constructed and stored (line 4). Then looping over all pruned relations and all tuples in each relation is performed. For each tuple t the nodes $V_t$ and edges $E_t$ for the tuple are determined (lines 10 and 11). The nodes are simply the elements in the attributes of the table and an additional key node if required. The edges connect all attributes to the key node.

Once the graph for the tuple has been defined, it may then compared with the graphs for each of the |q| query subgoals. For each subgoal, the association graph vertices may be defined by pairing variable nodes from the query with compatible tuple nodes. Compatible nodes have the same labeled loops which can be determined from the relation name (stored in tableName). Note that some of these a-vertices may have previously been generated. Even in such cases $\tilde{V}_a$ includes all a-vertices generated by the tuple and the subgoal graphs. However, when these a-nodes are added to the set $V_a$ of a-vertices duplicates are not permitted (line 15).

The AssocEDGES routine then generates the a-edges that are generated between the a-vertices stored in $\tilde{V}_a$. Compatible edges can be identified by knowing $\mu_q^i$ the relation name (tableName) and the attribute names (attrNames). Some of these edges may have previously been generated, but some and $G_q$. In some embodiments, the goal may be the identification of the largest common labeled pseudograph by finding a largest (maximum size) clique in the association graph. This makes intuitive sense since the maximum clique problem is to find the largest set of mutually connected nodes, and in the association graph a connection indicates the same relation or lack of relation.

A clique is a set of nodes all pairs of which are connected by edges. A clique on n nodes has $$\binom{n}{2}$$

edges. A maximal clique is a set of fully connected nodes in a graph such that an additional node cannot be added to the set with the set still remaining fully connected. The set of nodes making up a maximal clique is not necessarily a maximum clique, that is, the largest set of mutually connected nodes. The maximum or max clique (MC) problem in a graph $G=(V, E)$ having vertex set V and edge set $E \subseteq V \times V$ or equivalently the largest subset of nodes of V all pairs of which are connected by an edge, also known as the largest clique. MC is related to the maximum independent set problem (MIS)

through the complement graph, in other words, the MC of G is equal to the MIS of co-G where co-G=(V,E$^c$) and E$^c$=(V×V)\E. So E$^c$ is the set of anti-edges of G. MC is an NP complete problem.

The maximum clique in the association graph identifies a set of a-vertices in $V_a$. Recalling that the a-vertices consist of pairs of vertices from G$\mathcal{R}'$ and $G_q$ these flagged a-vertices define the values for the variables in the query by matching the $\upsilon_q$ vertex with the paired $\upsilon$ $\mathcal{R}'$ vertex. If the clique consists of all vertices of the association graph then the query can be matched exactly (in which case the query could also have been solved with a standard SQL query).

Of most interest is the case where the largest common pseudograph is a subset of the query. In this case there is no exact match so any standard SQL query would return an empty set of results. However, the largest common subgraph identifies the next best response to the query which requires the least number of relaxations to satisfy the query.

Ranking Query Responses

In some embodiments, it may be desirable to rank the results obtained from the RCSQL query. For example, the goal may be to focus on results requiring the fewest relaxations from the ideal specified in the query, or alternatively, the fewest relaxations of certain element(s) of the query.

In one embodiment, the results may be scored based on common subgraphs. The simplest ordering is based on the size of the clique determined for the association graphs, since the larger the clique, the larger the common sub-pseudograph. Knowing the nodes in the clique, the subpseudograph of the query may easily be determined. The largest possible subpseudograph is the entire query pseudograph itself. This result corresponds to an exact match (and therefore a match that could have been obtained with standard SQL alone).

If $s_{max}^q$ is the number of edges in the query graph and if any given clique C max corresponds to a subpseudograph of the query having $s^q(C)$ edges in common with the query then the score of result C may be normalized to $s^q(C)/s_{max}^q$. In this way, scores lie between 0 and 1 with 1 indicating a perfect match. In general, higher scores indicate fewer relaxations.

One important characteristic of the above scoring method is that the relation to relaxations of the predicates is obscured. Because of the extra nodes introduced into the query graph (required to represent non-2-arity relations) the score may not directly be interpretable in terms of relations. Therefore, in an alternative embodiment, scoring may be based on subgoals, that is, scoring may be based directly on the number of predicate entries relaxed. Let $n_R$ be the vector storing the number of predicates in each definition of the goal R. There is one element of $n_r$ for each disjunction in the definition of R. The number of predicates in any conjunctive rule is not simply the number of predicates in the rule. This is because possible relaxations returned from maximum cliques of the association graph may relax the requirement that groundings of the same variable appearing in different subgoals are all equal.

For example the goal $r_1(X_1,\ldots),r_2(X_1,X_2,\ldots),r_3(X_1,\ldots)$ under relaxations is more accurately represented as $r_1(X_1,\ldots),r_2(X'_1,X_2,\ldots),r_3(X''_1,X'_2\ldots),X_1=X'_1,$
$X_1=X''_1,X_2=X'_2$ This is because relaxations returned from the cliques of the association graph may possibly assign values for $X_1$ and $X'_1$ which are not identical. Thus, the effective number of predicates in this example is not 3 but 6.

In general then, if a rule r has P predicates, V variables and the $\upsilon$th variable occurs in $O(\upsilon)$ predicates then the effective number of predicates is $$n_R = P + \sum_{\upsilon=1}^{V} O(\upsilon)$$

A procedure to score a variable assignment returned by a clique follows. First, note that the clique (or equivalently the common subgraph) may not define groundings for all variables. Predicates involving any variable left ungrounded is assumed to not be satisfied. To score an assignment the number of predicates (after transformation in which the new equality predicates are added) satisfied by the assignment may be added and divided by the total number of predicates. This gives a normalized score lying between 0 and 1 with a perfect match (which could have been found by standard SQL) scoring 1. For rules involving disjunctions (multiple bodies) the assignments are scored against each body and the maximal score is chosen to define the score of the rule.

With any scoring method there may be multiple solutions having the same score. This might occur, for example, if the variable assignment was permutation independent (a permutation of the variables is also a valid assignment, for such as $(V_1, V_2, V_3)$=(1, 2, 3), $(V_1, V_2, V_3)$=(3, 1, 2), or $(V_1, V_2, V_3)$=(2, 3, 1) etc.) In such cases, it may be appropriate to show only a representative of such similar solutions. Or, depending on the user interface, the representative may be shown, and upon a mouse click may expand to show the complete list of related assignments having the same score.

The above scoring methods assume that all relaxations are equally as important. In other embodiments, such an assumption may be inappropriate, and scorings based on importance weights may be implemented. If this ranking is done as a postprocessing act this may be accomplished in a number of different ways, as will be appreciated by those of relevant skill in the art.

For example, a weight may be assigned to each subgoal in a query (in the unweighted case all subgoals are weighted equally). Given such weights ranking may be accomplished based on summing the importance weights (e.g., a value indicating a relative importance of one subgoal versus one or more other subgoals) of each satisfied subgoal. Scores can again be normalized relative to the maximal possible score $\Sigma_s w_s$ where the summation is over all subgoals and $w_s$ is the weight of the sth subgoal. This normalization may be applied to each branch in the definition of the goal.

If there are arithmetic subgoals, the arithmetic subgoals may be used to refine the ranking. For example, consider a subgoal X<4 and two relaxations where X=5 and X=50. Neither satisfies the subgoal and both might be given a score of 0. However, in some embodiments it may be desirable to rank the X=5 solution higher than the X=50 solution since it comes much closer to satisfying the predicate. Any arithmetic subgoals may be ranked and presented in this manner according to the magnitude of the constraint violation.

In some embodiments, subgoals may be negated. For example, if the query q(A,D) ← ¬starsIn(A,'Star Wars',D)

is posed, the query succeeds for all actors A and release dates D that are in the database and associated with movies that are not 'Star Wars'.

Conceptually, the query is processed by first selecting the starsIn table to limit to those tuples that are not 'Star Wars'. The following relation is defined:

$$\overline{\text{starsIn}} = (\pi_{actor,releaseDateYear}\text{starsIn}) \setminus (\pi_{actor,releaseDateYear} \sigma_{movie='Star\ Wars'}\text{starsIn})$$

and $$q(A,D) \leftarrow \overline{\text{starsIn}}(A,D).$$

In some cases, a more general notion of negation may be desirable. For example, if a graph represented as an edges table were known, it may be desirable to find the vertices not connected to node 1. This could be accomplished through the query $$\text{notConnected}(V) \leftarrow \overline{\text{edges}}(1,V)$$

The table $\overline{\text{edges}} \equiv (\pi_2 \text{edges}) \setminus (\pi_2 \sigma_{1=1} \text{edges})$ does not quite suffice because the first set selects only those vertices in the second column of edges. There may be other perfectly valid vertices that do not appear in the second column but that do appear in the first column of edges.

More generally, the Cartesian product of the domains of each variable may first be formed and then the set resulting from the selection subtracted. In this case $$\overline{\text{edges}} \equiv dom(V) \setminus \pi_2 \sigma_{1=1} \text{edges}$$

where $dom(V) = (\pi_1 \text{edges}) \cup (\pi_2 \text{edges})$.

In general, to handle any negated predicate $r_i(a,X)$ where a is the (perhaps empty) vector of ground attributes and X is the vector of variables, the negated r relation may be given by $$\bar{r} = \left( \bigotimes_{j \in c_i^x} dom(X_i) \right) \setminus \left( \pi_{c_i^x} \sigma_{c_i^x = a} r_i \right)$$

where $\otimes_{i \in cdi\ i}{}^x dom(X_i)$ is the Cartesian product of all variables in the free attributes of $r_i$, $\pi_{c_i^{ix}}$ projects to variable attributes, and $\sigma_{c_i^{gr}=a}$ selects tuples whose grounded attributes $c_i^{gr}$ are equal to a. The domains of the variables may be formed either by taking the union of the projections in the tables in which the variable appears as set out above, or they may be defined explicitly in certain circumstances. In such cases the domains could be stored in 1-arity relations.

In some embodiments, to increase the expressivity of query languages, it may be useful to dynamically add predicates that are not present in the original database as they are needed, such as comparison and arithmetic predicates. For numeric data, the binary relations $<, >, \leq, \geq, =$, and $\neq$ are useful. Conceptually these are tables with an infinite number of tuples, and they can be treated as such.

In the association graph, an edge involving an arithmetic relation is present/absent based on the comparison of grounded numbers, for example a-nodes (X, x) and (Y, y) (where X and Y are variables and x and y are grounded numbers) are connected under an X<Y relation if x<y and are not connected otherwise. Similarly, 1-arity comparisons such as X<4 resulting from projections may be accomplished the same way. When determining the set $V_a$ of a-vertices a vertex (X, x) is included only if x<4.

The results of binary arithmetic operations can be represented as 3-arity relations. For example the infinite table plus(X, Y, Z) represents the constraint Z=X+Y, similarly minus(X, Y, Z) represents Z=X−Y. That is, the triples X, Y, Z which satisfy the constraint in the table are listed. The attributes X and Y serve as a key for such tables. For any real database the domains of X and Y will be finite and thus the plus table needs only a finite (though perhaps large) number of tuples. Any arithmetic expression may be compiled down to a set of primitive relations.

For example $X_1 + 2 \times 2 - X_3 < X_4$ may be represented as $$\text{plus}(X_1,T_1,T_2), \text{times}(2,X_2,T_1), \text{minus}(T_2,X_3,T_4), <(T_4,X_4).$$

This decomposition may be easily determined by parsing the original arithmetic expression. In this format, with finite tables the query may be processed as usual. In some embodiments, it may be desirable to optimize this approach to minimize the sizes of the resulting association graphs. In the example, four new variables may be introduced so the number of new nodes is $|dom(T_1)| + |dom(T_2)| + |dom(T_3)| + |dom(T_4)|$ where $|dom(T)|$ is the domain size of T. These domain sizes may be determined using interval arithmetic.

In another embodiment, larger association graphs are required but the need for introduced variables (the $T_i$s) is eliminated. This approach explicitly forms the table representing the arithmetic expression. For example, a table E is used to directly store the true instances of the expression. If the expression involves a variables then the table has a-arity. Since at least one additional variable in the association graph is required for each tuple of the table, this alternative representation can require significantly more a-nodes. Of course, as will appreciated by those of skill in the relevant art, intermediates between these alternatives are also possible.

A similar approach may be used to add other useful relations. For example, if a user wished to test whether an element was a member of a particular set S, the elementOfS relation may be defined which lists the elements of S as tuples in the table. Typically, such tables would not be added to the existing database; rather a separate auxiliary database would be used. In this way, only reads of the original database are performed.

Solving Clique Problems

By employing the present systems, methods and articles, a query or database search may be reduced to the determination of cliques in the association graph formed from the query and the relevant portion of the database. As discussed below, a number of algorithms exist that may be used to solve the (max) clique problem, including both classical and quantum approaches.

Maximum clique is a well studied problem and there are many complete and incomplete methods. The typical association graphs that result from queries or database searches are large enough that complete methods are impractical and so focus is placed on incomplete search methods. Such methods will return large cliques, but not necessarily the largest clique. A number of such methods exist including Reactive Local Search, QUALEX-MS, Deep Adaptive Greedy Search, k-opt algorithm, Edge-AC+LS and Dynamic Local Search.

Quantum computing offers an alternative for solving maximum clique problems. The clique problem is embodied directly in physical hardware and natural physical evolution processes can be harnessed to determine cliques.

Each clique in the association graph gives a relaxation of the query. Larger cliques give better scoring and closer to ideal relaxations. The present systems, methods and articles employ the discovery of many preferably large cliques. Most of the classical heuristics and quantum algorithms are stochastic and naturally return random solutions. By repeatedly running such algorithms a number of distinct solutions may be obtained.

To decrease the likelihood that previously discovered answers are returned many of these algorithms can be simply modified so that a tunable amount of randomness affects the results. The higher the randomness setting the smaller the cliques but the more likely it is that the clique will be different from any previously discovered clique. Given this tunable randomness setting, the randomness may be slowly increased so that the better cliques are the first to be discovered.

Rather than finding large cliques in the association graph it may be useful to directly search for large common subgraphs between the query and database labeled pseudographs. There are algorithms which address this problem, but typically they have been developed only for simple graphs. In some cases however these algorithms are directly extensible to labeled pseudographs.

Translation from DATALOG to RCSQL

As discussed above, the present systems, methods and articles may be employed using DATALOG. However, while DATALOG makes the understanding and development of a relaxed constraint structured query language (RCSQL) much simpler, it is not a viable language in which to express RCSQL queries because it is not widely available in commercial database systems. However, because DATALOG and SQL have the same expressivity it is possible to realize RCSQL within SQL. As shown below, only a small change to SQL is required to realize RCSQL.

Just as RCSQL can be layered on top of DATALOG without changing to the underlying DATALOG language so too may RCSQL be layered on top of SQL. All that changes is the meaning of the query. With RCSQL the Boolean conditions appearing in the WHERE clause are relaxed so that one or more of the conditions may be relaxed. Scoring of results is based on the number of relaxations. SQL returns the answer set for no relaxations while RCSQL returns answer sets which include one or more relaxations. However, if desired a slight syntactic extension may be added to SQL to clearly distinguish between relaxed and unrelaxed queries. One way to accomplish this is with the addition of a single new statement which might be called ISELECT.

It is easiest to implement RCSQL by converting all SQL statements (excluding aggregation operators), e.g., statements including JOIN, etc., into equivalent relational algebra expressions. Relational algebra involves six fundamental operations: select (unary), project (unary), rename(unary), Cartesian product (binary), union (binary), and set difference (binary). RCSQL modifies only the select operation by relaxing the constraints on the predicate p in the select operator up. The binary predicate p may always be written in disjunction normal form (i.e., as a disjunction of conjunctive queries) so that $p=p_1 \vee p_2 \ldots \vee p_n$ where each $p_i$ is a conjunction of atomic predicates. The relaxed selection operator is indicated as $\tilde{\sigma}_p$. Where $\sigma_p R$ returns the set of tuples of R for which p is true, $\tilde{\sigma}_p R$ returns a set of tuples and some extra corresponding information. Recall that the score assigned to each tuple t in R arises from a conjunctive Boolean expression. With each tuple the number of literals in the conjunction and the number that were satisfied are then stored. The score is then easily determined by dividing the number of atomic predicates satisfied by the total number. Thus, rather than just carrying around a set of tuples associated with R, a set of tuples having two additional attributes may be carried, one for the number of atomic predicates involved in the score, and the other giving the number of satisfied atomic predicates. A set of such tuples is indicated as $\tilde{R}=(R, s_1, s_2)$ where $s_1$ and $s_2$ give the corresponding scoring information. The function $rel(\tilde{R})=R$ is defined which extracts the relation in a scored relation.

In order to define how the relational algebra operators act on the extended scored relations, assume the relations are a set of tuples. To start, $\tilde{\sigma}_p$ acting on an unscored relation R returns a scored relation $\tilde{R}$. The tuples and the scorings in $\tilde{R}$ are determined as before by a largest common subgraph matching. Relaxed selection acting on scored relations $\tilde{R}$, i.e., $\tilde{\sigma}_p \tilde{R}$, behaves differently and must account for previous scoring. This is accomplished by requiring that $\tilde{\sigma}_p \tilde{\sigma}_q$ acts as $\tilde{\sigma}_{p \cdot q}$ just as is the case for the standard selection operator. As before, an assumption is made that $p=p_1 \vee \ldots \vee p_n$ is in disjunctive normal form. All tuples $t^i \in \tilde{R}$ arise from some a conjunction $q_1^i \wedge \ldots \wedge q_{m^i}^i$ of which $l^i \leq m^u$ atomic predicates are true. $l^i$ and $m^i$ are stored as additional attributes in $\tilde{R}$. Once the effect of $\tilde{\sigma}_p$ on $rel(\tilde{R})$ has been determined the scoring can be updated based on $l^i$ and $m^i$. If $\hat{t}^k$ is the kth tuple of $\tilde{\sigma}_p \tilde{R}$ then this corresponds to some conjunctive subexpression $p_{j^k}$ of p. The common subgraph determines which of the conjuncts within $p_{j^k}$ are true and which have been relaxed. The number of conjuncts within $p_{j^k}$ as $\hat{m}^k$ and the number of satisfied conjuncts are indicated as $l^k$. Ignoring the effects of the previous scores in $\tilde{R}$ this tuple would give the score $l^k/\hat{m}^k$. However, since the tuple $\hat{t}^k$ arose from a tuple in $\tilde{R}$ having a score $l^i/m^i$, an update is made to the total number of conjuncts to $\hat{m}^k + m^i$ and the total number of satisfied conjuncts to $l^k + l^i$. Thus, the score of the tuple $\hat{t}^k$ is $(l^k + l^i)/(\hat{m}^k + m^i)$. This can be determined solely from the previously recorded score and does not require knowing what the actual conjunctive query was that gave rise to the tuple $t^i$ that was used to generate $\hat{t}^k$. This scoring update mechanism also suggests that all relations, scored or unscored, may be viewed as scored relations where an unscored relation is a scored relation having score (0, 0).

The other five relational algebra operators act on scored relations as follows: If $\theta_1$ is a unary relational algebra operator (project or rename) then the action of $\theta_1$ on scored relation $\tilde{R}=(R, s_1, s_2)$ is simply $\theta_1 \tilde{R} \equiv (\theta_1 R, s_1, s_2)$. Similarly, if $\theta_2$ is a binary operator (union, set difference) then $\tilde{R} \theta_2 \tilde{R}' \equiv (R \theta_2 R', s_1 \theta_2 s'_1, s_2 \theta_2 s'_2)$ where a consistent order is preserved in the different uses of $\theta$ so that scores are associated with the correct tuple.

CONCLUSION

In some embodiments of the present systems, methods and articles, a graph, for example an association graph, is embedded into a two-dimensional lattice 200 (FIG. 2) of qubits 152. The computing system 100 may use a variety of techniques for embedding the graph. For example, the computing system 100 may employ a "braided layout" technique or other technique described in commonly assigned patent application Ser. No. 60/864,129, filed Nov. 2, 2006, and entitled "GRAPH EMBEDDING TECHNIQUES". Consider an arbitrary graph to be embedded that contains N vertices and M edges. The braided layout technique of graph embedding involves assigning each vertex to a set of coupled qubits in the lattice, thereby producing N sets of coupled qubits. The assignment is carried out such that a fully connected N-vertex graph, that is, a graph with N vertices in which each vertex is connected by edges to every other vertex, can be embedded into the lattice. After the vertices have been assigned, each edge of the graph is assigned to a coupling device in the lattice between the two sets of qubits that correspond to the two vertices the edge connects.

All of the U.S. patents, U.S. patent application publications, U.S. patent applications, foreign patents, foreign patent applications and non-patent publications referred to in this specification, including but not limited to U.S. provisional patent application Ser. No. 60/864,127, filed Nov. 2, 2006 and entitled "PROCESSING RELATIONAL DATABASE PROBLEMS USING ANALOG PROCESSORS" and U.S. provisional patent application Ser. No. 60/864,129, filed on Nov. 2, 2006, and entitled "GRAPH EMBEDDING TECHNIQUES", are incorporated herein by reference, in their entirety and for all purposes.

As will be apparent to those skilled in the art, the various embodiments described above can be combined to provide further embodiments. Aspects of the present systems, methods and articles can be modified, if necessary, to employ systems, methods, articles and concepts of the various patents, applications and publications to provide yet further embodiments of the disclosed systems, methods and articles. For example, the various methods described above may omit some acts, include other acts, and/or execute acts in a different order than set out in the illustrated embodiments.

Various ones of the modules may be implemented in existing software packages. Suitable software packages include, but are not limited to, MATLAB (The MathWorks, Natick, Mass.) and LabVIEW (National Instruments, Austin, Tex.).

The present methods, systems and articles also may be implemented as a computer program product that comprises a computer program mechanism embedded in a computer readable storage medium. For instance, the computer program product could contain the program modules shown in FIG. 1. These program modules may be stored on CD-ROM, DVD, magnetic disk storage product, or any other computer readable data or program storage product. The software modules in the computer program product may also be distributed electronically, via the Internet or otherwise, by transmission of a data signal (in which the software modules are embedded) embodied in a carrier wave.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

Further, in the methods taught herein, the various acts may be performed in a different order that that illustrated and described. Additionally, the methods can omit some acts, and/or employ additional acts.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

We claim:

1. A method of obtaining answers to database queries, the method comprising:
    determining a query graph representative of a query;
    determining an association graph based on the query graph and based on a database graph, the database graph representative of at least a portion of information stored in a database; and
    evolving an analog processor to a final state representative of a clique of the association graph.

2. The method of claim 1 wherein the clique of the association graph is a maximum clique.

3. The method of claim 1 wherein evolving an analog processor to a final state representative of a clique of the association graph includes evolving a quantum processor into which the association graph has been embedded.

4. The method of claim 1 wherein determining a query graph representative of a query includes converting a number of elements of information into a number of labeled nodes of a graph, and converting a number of relations between the elements of information into a number of labeled edges between pairs of nodes of the graph.

5. The method of claim 4 wherein converting a number of relations between the elements of information into a number of labeled edges between pairs of the nodes of the graph includes converting the number of relations between the elements of information into a number of directed edges between pairs of nodes of the graph.

6. The method of claim 1 wherein determining an association graph based on the query graph and based on a database graph includes, for all of a number of pairwise combinations of association vertices in the association graph, forming an edge between the association vertices in the association graph only if a respective pair of vertices in the query graph that the association vertices represent a same relation as a pair of vertices in the database graph that the association vertices represent.

7. The method of claim 1 wherein determining a query graph includes determining a query graph for an over-constrained query.

8. The method of claim 1 wherein the portion of information stored in the database is representative of at least two possible responses to the query.

9. The method of claim 8 wherein evolving the analog processor to a final state representative of a clique of the association graph includes evolving the analog processor a plurality of times to a plurality of final states, each final state representative of a maximal clique of the association graph.

10. The method of claim 9, further comprising:
    ranking the plurality of final states according to a relative responsiveness of the clique associated with each final state.

11. The method of claim 1, further comprising:
providing a number of responses to the query in a ranked order based on a determined clique of the association graph.

12. The method of claim 1, further comprising:
determining the database graph from a database.

13. The method of claim 12 wherein determining the database graph from a database includes forming the database graph from only a portion of the database.

14. A method of solving database queries, the method comprising:
determining a query graph representative of a query, the query graph including a number of nodes and a number of edges between pairs of nodes;
determining an association graph based on the query graph and based on a database graph, the database graph representative of at least a portion of information stored in a database of information that does not represent three-dimensional geometry; and
determining a clique of the association graph.

15. The method of claim 14 wherein the clique of the association graph is a maximum clique.

16. The method of claim 14 wherein determining a clique of the association graph includes evolving an analog processor.

17. The method of claim 14 wherein determining a clique of the association graph includes evolving a quantum processor into which the association graph has been embedded.

18. The method of claim 14 wherein determining a query graph representative of a query includes converting a number of elements of information into a number of labeled nodes of a graph, and converting a number of relations between the elements of information into a number of labeled edges between pairs of nodes of the graph.

19. The method of claim 18 wherein converting a number of relations between the elements of information into a number of labeled edges between pairs of nodes of the graph includes converting the number of relations between the elements of information into a number of directed edges between pairs of the nodes of the graph.

20. The method of claim 14 wherein determining an association graph based on the query graph and based on a database graph includes, for all of a number of pairwise combinations of association vertices in the association graph, forming an edge between the association vertices in the association graph only if a respective pair of vertices in the query graph that the association vertices represent a same relation as a pair of vertices in the database graph that the association vertices represent.

21. The method of claim 14 wherein determining a query graph includes determining a query graph for an over-constrained query.

22. The method of claim 14 wherein the portion of information stored in the database is representative of at least two possible responses to the query.

23. The method of claim 14, further comprising:
determining the database graph from a database.

24. The method of claim 23 wherein determining the database graph from a database includes forming the database graph from only a portion of the database.

25. A system operable to solve database queries, the system comprising:
at least one processor operable to execute instructions;
at least one computer-readable medium storing instructions that cause the at least one processor to determine a query graph representative of a query and to determine an association graph based on the query graph and based on a database graph, the database graph representative of at least a portion of information stored in a database;
an analog processor operable to evolve to a final state representative of a clique of the association graph; and
a controller subsystem operable to embed the association graph into the analog processor.

26. The system of claim 25 wherein the analog processor includes a quantum processor including a plurality of qubits and a plurality of coupling devices coupling respective pairs of qubits and which is capable of natural physical evolution.

27. The system of claim 26 wherein the controller subsystem is operable to set parameters of at least some of the qubits and the coupling devices.

28. The system of claim 25, further comprising:
a storage device storing the database.

29. The system of claim 28 wherein the database stores information that does not represent three-dimensional geometry.

30. The system of claim 25, further comprising:
at least one of a server, a scheduler or a meta-optimizer.

31. A system operable to solve database queries, the system comprising:
at least one processor operable to execute instructions; and
at least one computer-readable medium storing instructions that cause the at least one processor to determine a query graph representative of a query, determine an association graph based on the query graph and based on a database graph, the database graph representative of at least a portion of information stored in a database of information that does not represent three-dimensional geometry, and determine a clique of the association graph.

32. The system of claim 31 wherein the at least one processor includes an analog processor operable to evolve to a final state representative of the clique of the association graph.

33. The system of claim 32 wherein the analog processor includes a quantum processor including a plurality of qubits and a plurality of coupling devices coupling respective pairs of qubits and wherein the quantum processor is capable of natural physical evolution, the system further comprising:
a controller subsystem operable to set parameters of at least some of the qubits and coupling devices.

34. The system of claim 32 wherein the at least one processor includes a digital processor operable to determine the query graph by converting a number of elements of information into a number of labeled nodes of a graph, and converting a number of relations between the elements of information into a number of labeled edges between pairs of nodes of the graph.

35. The system of claim 32 wherein the at least one processor includes a digital processor operable to determine the association graph by: for all of a number of pairwise combinations of association vertices in the association graph, forming an edge between the association vertices in the association graph only if a respective pair of vertices in the query graph that the association vertices represent a same relation as a pair of vertices in the database graph that the association vertices represent.

36. The system of claim 32 wherein the portion of information stored in the database is representative of at least two possible responses to the query.

37. The system of claim 32 wherein the at least one processor includes at least one analog processor and the system further comprises:
a controller subsystem operable to embed the association graph into the at least one analog processor.

38. A method of converting a database including at least one n-arity relation, where n is greater than 2, into a labeled database pseudograph, the method comprising:

for each n-arity relation,
aggregating a set of attributes which uniquely identify a tuple into a single compound attribute; and
generating a respective table in the database for each of the attributes that is not a key such that each table in the database represents a 2-arity or less-arity relation;
identifying each element in a set of elements for each of the tables representing a 2-arity or less-arity relation with a respective vertex in the pseudograph;
for each 1-arity relation, adding a loop to the respective vertex; and
for each 2-arity relation, adding an edge between a respective pair of vertices.

39. The method of claim 38 wherein generating a respective table in the database for each of the attributes that is not a key such that each table in the database represents a 2-arity or less-arity relation includes generating a 2-arity table consisting of a compound attribute and an attribute that is not part of the compound attribute.

40. A computer-readable medium that stores instructions for causing at least one processor to convert a database including at least one n-arity relation, where n is greater than 2, into a labeled database pseudograph, by:

for each n-arity relation,
aggregating a set of attributes which uniquely identify a tuple into a single compound attribute; and
generating a respective table in the database for each of the attributes that is not a key such that each table in the database represents a 2-arity or less-arity relation;
identifying each element in a set of elements for each of the tables representing a 2-arity or less-arity relation with a respective vertex in the pseudograph;
for each 1-arity relation, adding a loop to the respective vertex; and
for each 2-arity relation, adding an edge between a respective pair of vertices.

41. The computer-readable medium of claim 40 wherein generating a respective table in the database for each of the attributes that is not a key such that each table in the database represents a 2-arity or less-arity relation includes generating a 2-arity table consisting of a compound attribute and an attribute that is not part of the compound attribute.

42. A method of converting a database including at least one n-arity relation, where n is greater than 2, into a labeled database pseudograph, the method comprising:

for each of a number of tables having a key and multiple attributes, splitting the table into a set of tables each consisting of a key and a single attribute;
identifying each element in a set of elements for each of the tables representing a 2-arity or less-arity relation with a respective vertex in the pseudograph;
for each 1-arity relation, adding a loop to the respective vertex; and
for each 2-arity relation, adding an edge between a respective pair of vertices.

43. A computer-readable medium that stores instructions for causing at least one processor to convert a database including at least one n-arity relation into a labeled database pseudograph, where n is greater than 2, by:

for each of a number of tables having a key and multiple attributes, splitting the table into a set of tables each consisting of a key and a single attribute;
identifying each element in a set of elements for each of the tables representing a 2-arity or less-arity relation with a respective vertex in the pseudograph;
for each 1-arity relation, adding a loop to the respective vertex; and
for each 2-arity relation, adding an edge between a respective pair of vertices.

44. A system to process queries of databases, the system comprising:
an analog processor;
a conversion subsystem that receives a problem and parses the problem into subproblems suitable for processing by the analog processor; and
a controller subsystem that receives the subproblems and is operable to set at least one parameter of the analog processor to embed the subproblems into the analog processor.

45. The system of claim 44 wherein the analog processor includes a quantum processor including a plurality of qubits and a plurality of coupling devices coupling respective pairs of qubits, the quantum processor being capable of natural physical evolution and wherein the controller subsystem is operable to set parameters of at least some of the qubits and the coupling devices.

46. The system of claim 44 wherein the conversion subsystem includes a server configured to receive the problem and to provide at least one answer to the problem based on the processing of the subproblems by the analog processor.

47. The system of claim 46 wherein the server is configured to receive multiple problems and the conversion subsystem further includes a scheduler configured to schedule the received problems for processing by the analog processor.

48. The system of claim 44 wherein the conversion subsystem includes a meta-optimizer configured to facilitate the parsing of the problem into subproblems.

49. The system of claim 44 wherein the conversion subsystem is further operable to convert an output parameter of the analog processor into a respective subanswer of a respective subproblem.

50. The system of claim 49 wherein the conversion subsystem is further operable to determine whether the subanswer is valid, and to resubmit the subproblem if the subanswer is determined to be invalid.

51. The system of claim 50 wherein the conversion subsystem is further operable to determine whether all subproblems have valid subanswers, and to combine a plurality of subanswers to the subproblems into an answer to the problem if all of the subproblems have valid subanswers.

52. The system of claim 51 wherein the conversion subsystem is further operable to determine whether the answer to the problem is adequate, and to resubmit the problem if the answer is determined to be inadequate.

53. The system of claim 52 wherein the conversion subsystem is further operable to determine if a subsequent answer to the problem is better than a previous answer to the problem, and to store the subsequent answer if the subsequent answer is determined to be better than the previous answer.

54. The system of claim 44 wherein the conversion subsystem is further operable to combine a plurality of subanswers to the subproblems into an answer to the problem.

55. The system of claim 44, further comprising:
a memory storing a set of instructions to interface with an end user application.

56. The system of claim 55 wherein the memory is local with respect to the conversion subsystem.

57. The system of claim 55 wherein the memory is local with respect to the end user application.

58. The system of claim 44, further comprising:
a memory storing a database which is subject to queries.

59. A method of processing queries of databases, the method comprising:
receiving a problem;
parsing the problem into subproblems of suitable size to be processed by an analog processor;
for each of the subproblems,
setting a number of parameters of the analog processor to embed the subproblem into the analog processor;
determining a subanswer to the subproblem from a final state of the analog processor.

60. The method of claim 59 wherein the analog processor includes at least one quantum processor including a plurality of qubits and a plurality of coupling devices coupling respective pairs of qubits, the at least one quantum processor capable of evolving to the final state, and wherein setting a number of parameters of the analog processor to embed the subproblem into the analog processor includes setting parameters of at least some of the qubits and the coupling devices.

61. The method of claim 60, further comprising:
evolving the quantum processor to the final state.

62. The method of claim 59, further comprising:
scheduling the received problem for processing by the analog processor.

63. The method of claim 59 wherein parsing the problem into subproblems of suitable size to be processed by the analog processor includes optimizing the subproblems for processing on the analog processor.

64. The method of claim 59, further comprising:
converting parameters of the analog processor into subanswers to the subproblems.

65. The method of claim 59, further comprising:
determining whether at least one of a number of subanswers is valid or invalid; and
resubmitting a respective subproblem if the respective subanswer is determined to be invalid.

66. The method of claim 59, further comprising:
determining whether all subproblems have a respective subanswer; and
combining the subanswers to the subproblems into an answer to the problem if all of the subproblems have subanswers.

67. The method of claim 59, further comprising:
determining whether an answer to a problem is adequate; and
resubmitting the problem for processing by the analog processor if the answer is determined to be inadequate.

68. The method of claim 59, further comprising:
determining if an answer to the problem is better than a previous answer to the problem; and
storing the answer if the answer is determined to be better than the previous answer to the problem.

69. The method of claim 59 further comprising:
converting a problem from an end user application format into a generalized format.

\* \* \* \* \*